(12) United States Patent
Seder

(10) Patent No.: US 11,604,405 B2
(45) Date of Patent: Mar. 14, 2023

(54) MANUALLY-OPERATED CODED IMAGE ANIMATION DEVICE

(71) Applicant: Rufus Butler Seder, Arlington, MA (US)

(72) Inventor: Rufus Butler Seder, Arlington, MA (US)

(*) Notice: Subject to any disclaimer, the term of this patent is extended or adjusted under 35 U.S.C. 154(b) by 699 days.

(21) Appl. No.: 16/518,972

(22) Filed: Jul. 22, 2019

(65) Prior Publication Data

US 2020/0026176 A1  Jan. 23, 2020

Related U.S. Application Data

(60) Provisional application No. 62/701,361, filed on Jul. 20, 2018.

(51) Int. Cl.
*G03B 25/02* (2006.01)
*G06T 13/80* (2011.01)
*G09F 11/00* (2006.01)
*G09F 19/12* (2006.01)

(52) U.S. Cl.
CPC ............. *G03B 25/02* (2013.01); *G06T 13/80* (2013.01); *G09F 11/00* (2013.01); *G09F 19/12* (2013.01)

(58) Field of Classification Search
CPC .......... G09F 19/14; G09F 11/00; G09F 19/12; G03B 25/02; G06T 13/80
USPC ..... 40/454, 453, 445, 488, 611.06; 359/463, 359/619
See application file for complete search history.

(56) References Cited

U.S. PATENT DOCUMENTS 2,367,967 A * 1/1945 Schwartz ............... G03B 15/08
446/151
3,480,352 A 11/1969 Deninson et al.
3,562,941 A 2/1971 Boden
(Continued)

FOREIGN PATENT DOCUMENTS

CN        107111152 A     8/2017
DE     202011052092 U1    2/2012
(Continued)

OTHER PUBLICATIONS

"Monster Magic Action Cards" Abby Finishing Company, Brooklyn, New York, 1963, https://dangerousminds.net/comments/monster_magic_action_trading_cards.

*Primary Examiner* — Jonathan Liu
*Assistant Examiner* — Rachel Mae Griffith
(74) *Attorney, Agent, or Firm* — O'Connell Law Firm; Thomas P. O'Connell

(57) ABSTRACT

A manually-operated coded image animation device a coded image viewer with a front panel, a reception area, such as a slot open on three sides or a channel, behind the front panel, and coded image decoding elements disposed on the front panel. A coded image card with a plurality of coded images can be manually inserted into the reception area in the coded image viewer. Animation of the coded images can be realized by a sliding movement of the coded image card in relation to the coded image viewer or by a rearward and forward rocking of the coded image viewer in relation to a podium by manual activation. A pivoting structure can be formed by a lever arm, a counterweight, and the coded image viewer with the lever arm received through a slot in the podium. A biasing system biases the coded image card into face-to-face contact with the front panel.

7 Claims, 27 Drawing Sheets

(56) References Cited

U.S. PATENT DOCUMENTS

| | | | |
|---|---|---|---|
| 5,364,274 A | 11/1994 | Sekiguchi | |
| 5,456,033 A * | 10/1995 | Sachnoff | G09F 1/12 |
| | | | 40/649 |
| 5,494,445 A * | 2/1996 | Sekiguchi | G09F 11/04 |
| | | | 434/96 |
| 5,588,526 A | 12/1996 | Fantone et al. | |
| 5,647,151 A | 7/1997 | Fantone et al. | |
| 5,710,666 A | 1/1998 | McDonald | |
| 5,757,545 A | 5/1998 | Wu et al. | |
| 5,901,484 A | 5/1999 | Seder | |
| 6,070,349 A * | 6/2000 | Fantone | G03B 25/02 |
| | | | 40/454 |
| 6,070,350 A | 6/2000 | Fantone et al. | |
| 6,078,424 A | 6/2000 | Morton | |
| 6,357,153 B1 | 3/2002 | Gelardi et al. | |
| 6,373,637 B1 * | 4/2002 | Gulick, Jr. | G02B 30/29 |
| | | | 40/454 |
| 6,422,859 B1 | 7/2002 | Demetz | |
| 6,532,690 B1 | 3/2003 | Vachette et al. | |
| 6,624,947 B2 | 9/2003 | McKinley | |
| 6,843,009 B2 | 1/2005 | Kainen | |
| 6,903,874 B1 | 6/2005 | Karterman | |
| 7,136,185 B2 * | 11/2006 | Goggins | H04N 1/00201 |
| | | | 358/3.29 |
| 7,151,541 B2 | 12/2006 | Seder | |
| 7,331,132 B1 | 2/2008 | Seder | |
| 2004/0027311 A1 | 2/2004 | Hunt | |
| 2006/0230657 A1 * | 10/2006 | Kotze | G09F 11/00 |
| | | | 40/454 |
| 2007/0086089 A1 | 4/2007 | Hunt | |
| 2007/0285804 A1 | 12/2007 | Raymond et al. | |
| 2009/0056181 A1 | 3/2009 | Meyer et al. | |

FOREIGN PATENT DOCUMENTS

| | | |
|---|---|---|
| EP | 1830338 A1 | 9/2007 |
| JP | 3159334 U | 5/2010 |
| WO | WO2006054284 A1 | 5/2006 |

\* cited by examiner

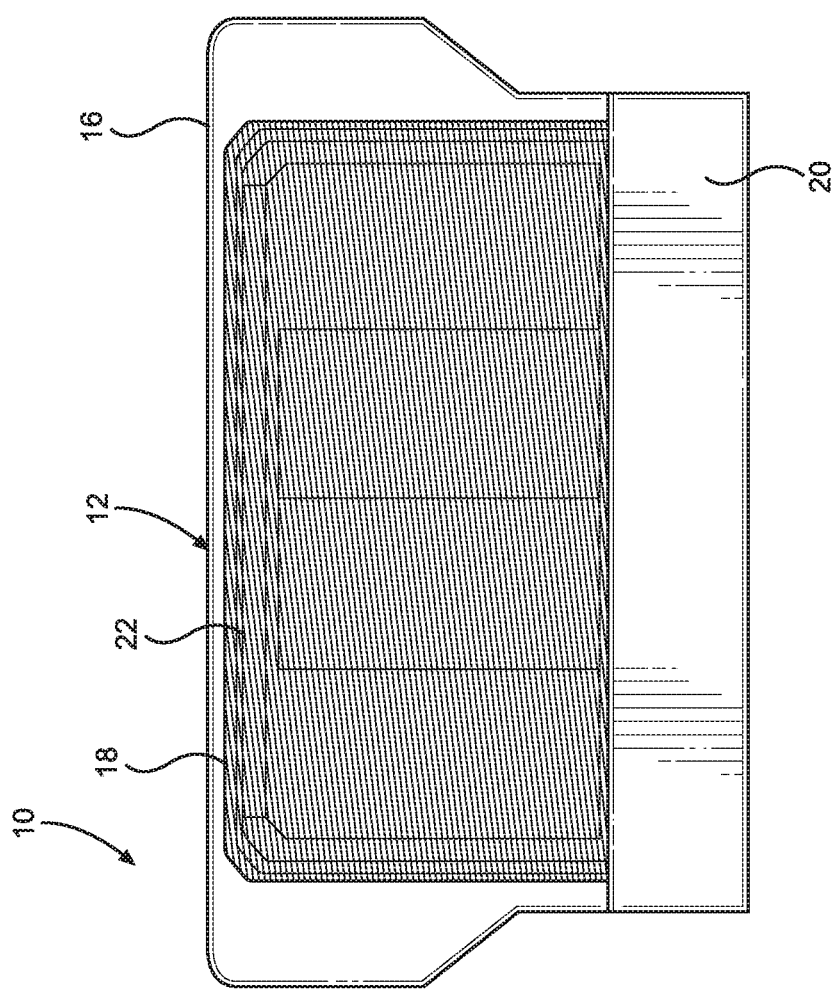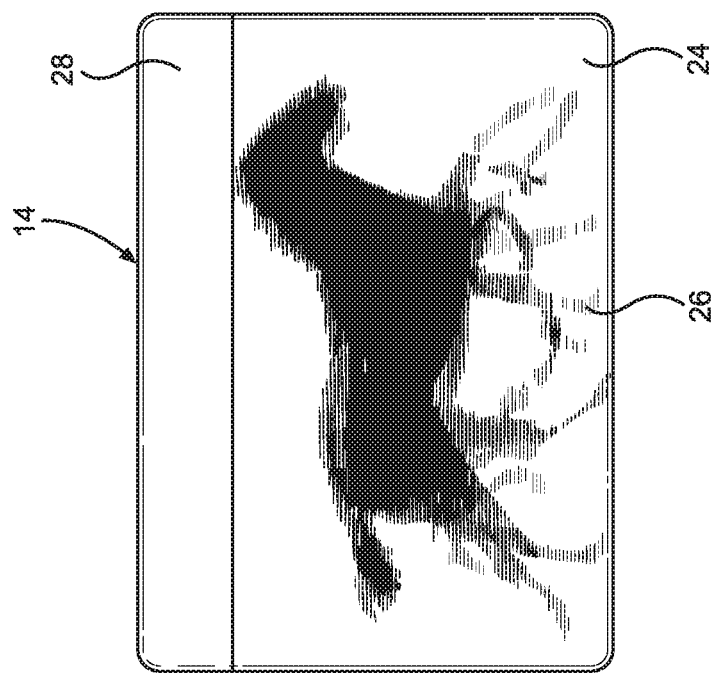
FIG. 1

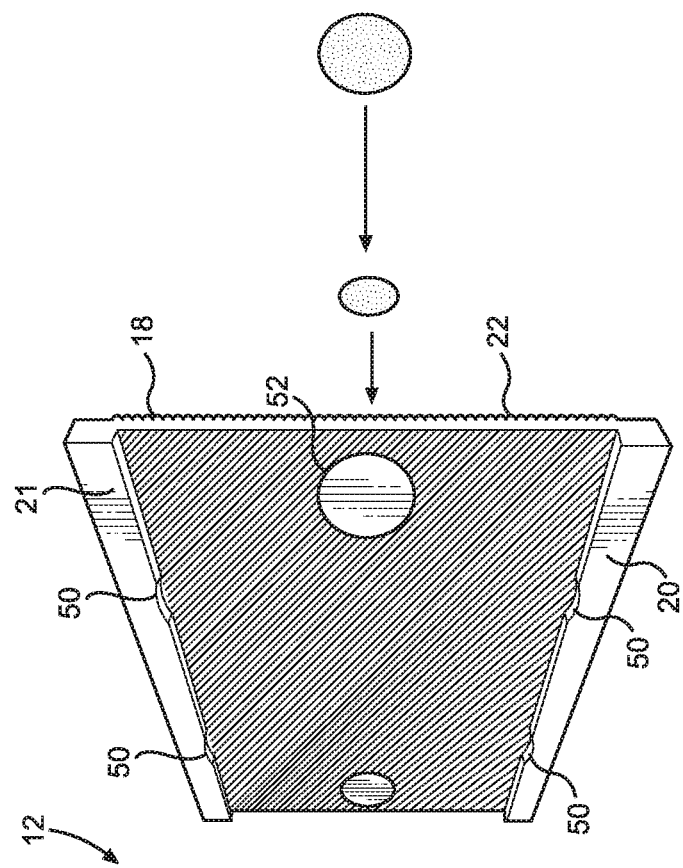
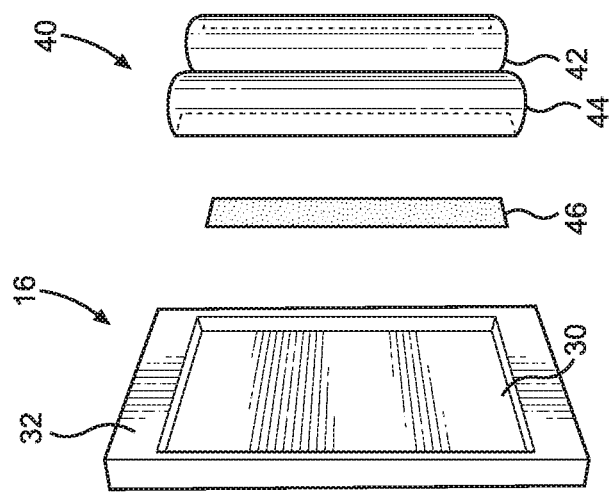
FIG. 10

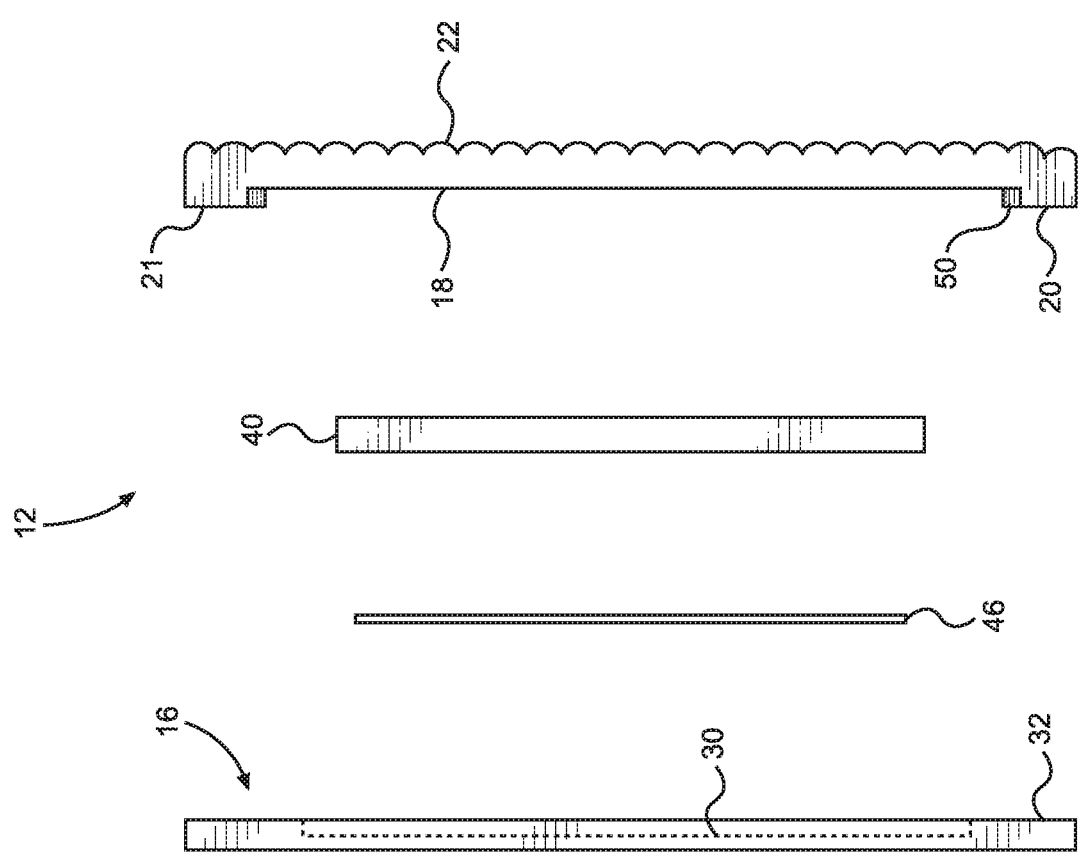

MANUALLY-OPERATED CODED IMAGE ANIMATION DEVICE

RELATED APPLICATION

This application is claims priority to U.S. Provisional Application No. 62/701,361, filed Jul. 20, 2018, which is incorporated herein by reference.

FIELD OF THE INVENTION

This invention relates generally to coded image display devices, including lenticular motion cards and other devices. More specifically, the present invention permits the user to swipe or slide an encoded card through an open-sided decoding device, such as a lenticular decoding viewing device, manually and at an instinctive rate of speed thereby to display animations, potentially in-place, cycling animations, that can be realistically-cadenced and rendered longer in duration than is possible with traditionally-configured manually-operated coded image displays.

BACKGROUND OF THE INVENTION

Animated coded image display devices, specifically lenticular and barrier grid displays, are well-known. Many of them, including some patented by this inventor, have enjoyed worldwide success. Some rely upon hand-operated mechanics, electricity, or motors to operate, but the most enduring and successful such product in the world market is the direct, hands-on, manually operated lenticular animation or motion card. Typically resembling a playing card in size, shape, and thickness, such a card need only be held in the hand and tilted back and forth, toward and away from the eye, to display a brief burst of animation or image transformation to the observer.

First introduced to the public almost 100 years ago, the manually operated lenticular animation card has remained essentially unchanged in design and continues to thrive in the international marketplace, surviving competition from the advent of more sophisticated animation imaging devices such as digital tablets and smart phones.

The present invention seeks to improve upon that classic device to expand its capabilities, particularly with respect to the display of convincing, longer-lasting, realistically-cadenced animated motion. For the reader to appreciate the inventive contributions described herein, it will first be helpful to understand how the original manually operated lenticular animation card functions.

The Manually Operated Lenticular Motion Card. As the manually operated lenticular motion card is slowly tilted before the eye in one direction from one tilt extreme to the other, a series of different still images, usually numbering two to six or more, display themselves to the eye in rapid succession. The images repeat their sequence of presentation approximately two and half times before the card has been tilted so far that said images are no longer discernible to the eye.

Generally speaking, three visual effects are most commonly exploited in such a device:

The first is the simple two-phase "flip", in which one image appears to magically transform into another. For example, as the observer tilts the card, the image of Dr. Jekyll may appear to transform into the image of Mr. Hyde. As the card is rotated even further, continuing from one tilt extreme to the other, this transformation effect will repeat itself approximately two and a half times until the card is tilted at so oblique an angle to the eye that the image can no longer be viewed so that this would have Transformation 1: Jekyll to Hyde; Repeat Transformation 2: Jekyll to Hyde; Repeat Transformation 2½: Jekyll to image indistinct.

The second visual effect commonly employed in such devices is the display of a limited burst of animated motion, which has a distinctive start and stop, such as a baseball pitcher first winding up then pitching a ball. This animated motion effect is achieved by tilting the card to display a series of several, such as three to six but possibly more, still images to the eye in rapid succession, each depicting a progressive phase of a given subject's movement, resulting in the illusion of motion. While the card is being tilted slowly in one direction at a steady rate of speed, this limited action will appear to complete itself and then suddenly start over again, replaying itself approximately two and a half times from one tilt extreme of the card to the other. If the card is then tilted in the reverse direction, this same action will appear to repeat itself two and a half times, but with reverse action.

The third most common and arguably the most dynamic visual effect achievable with this device is that in which a subject appears to engage in continuous, unbroken, forward-moving action for the entire duration of the card's tilt from one extreme to the other. This is accomplished through the design of what is known as an animation cycle. In such a cycle, the series of images, again, usually numbering three to six, but possibly more, to be presented to the eye are designed in such an order that, just as the first image relates to the second, the second to the third, and so on, the last image in the sequence will relate back to the first. Because such an animation cycle does not have any true start or stop point, when it repeats itself two and a half times during the tilting of the card, the observer instead perceives the displayed motion to play smoothly, continuously, and without any interruption whatsoever from one tilt extreme to the other. To better illustrate, one may imagine six sequential still images, each depicting a progressive phase in the gallop cycle of a horse. Just as the first animation phase of the horse's leg positions relates to the second, and the second to the third, and so on, the sixth animation phase of the horse's leg positions relate back to the first. Thus, as the card is tilted from one extreme to the other, the horse will appear to gallop fluidly and continuously for two and a half gallops (1, 2, 3, 4, 5, 6, 1, 2, 3, 4, 5, 6, 1, 2, 3 . . . ) without apparent interruption.

Construction of the Manually Operated Lenticular Motion Card. The simplicity of the operation of this device belies the complexity behind its design and construction. For such a lenticular device to be effective, it must be a precisely-engineered marriage between two distinctly differently manufactured parts, namely a clear lenticular front plate and a printed image carrier directly behind it. These two parts must first be fabricated to extreme tolerances and then precisely aligned and permanently laminated to one another.

The front layer of the device, the clear lenticular plate, is typically composed of a thin, rigid sheet of optically clear plastic. The face of the plate is embossed with a series microscopic cylindrical convex lenses, referred to herein as lenticules, running parallel to one another and designed to be oriented horizontally to the observer's eyes. This horizontal arrangement of lenticules ensures that the observer's two eyes will always see each of the images at the same time as they are displayed in succession during the tilting of the card. To perceive the illusion of motion, both eyes must first clearly see a subject in one position, then, a moment later, clearly see that subject in another position.

On the other hand, if the lenticules were oriented vertically, the observer's two eyes would see two different images at the same time, creating visual confusion and thus compromising the perception of clear, fluid animation. While vertically-oriented lenticules can be useful in a stereo three-dimensional lenticular card where it is desirable for each of the observer's two eyes to see a different image at the same time, they are not useful in presenting clear, fluid animation. Although vertically oriented lenticules can and have been employed to achieve a very limited animation effect in tandem with stereo three-dimensional imagery, the present invention is instead concerned primarily with the achievement of clear, fluid, convincing animation.

The higher the count of lenticules per inch, the higher the resolution of the image presented to the eyes. From a practical standpoint, for an animated lenticular card, which might be intended to be hand-held 15 to 20 inches from the eyes, the industry has determined that a count of somewhere between 25 lenticules per inch (lpi) to 50 lpi, usually around 30 lpi, is preferred. One reason for this is that the smooth flat backside of the lenticular plate should be precisely manufactured to be at the exact focal distance of the lenticules so they can optically focus on and thus decode the printed scrambled image directly beneath them. It has been determined that a 30 lpi lenticular plate will not only display an image of sufficient resolution to the eye but, from a more practical point of view, will also, being about the same thickness as a credit card, be of sufficient resilience and rigidity to withstand repeated use by the customer. While a 15 lpi lenticular plate would be extremely thick, such as approximately ⅛ inch, and even more durable, it would cost more to produce because of the increased material and the overall grossness of the lenses would cause the displayed image to be too low in resolution to be easily discerned by the user. At the other extreme, a 60 lpi lenticular plate, being extremely thin, might too easily bend and deform from repeat handling by the user. One would expect the image resolution to be superb at this high of a lens count, but the manufacturing and alignment tolerances demanded, especially for the depiction of crisp, clear animation, would be extremely difficult to achieve.

The rear layer of the device, the image carrier, is usually composed of common paper-based card stock, its front surface imprinted with a specially-designed coded image. This coded image, which may appear blurry or even indecipherable when viewed with the naked eye, is composed of a series of finely-printed coded image clusters. The number of coded image clusters can correspond to the number of lenticules in the lenticular plate, and each image cluster can be approximately the same width as any one lenticule in the lenticular plate. Each image cluster is comprised of a number of microscopic, printed, striated segments of, and equal in number to, the several still images to be displayed in the card. These striated segments and, in turn, the image clusters they form, are arranged consecutively side by side across the face of the card, oriented in a similar horizontal manner to the lenticules in the lenticular plate.

During factory assembly of the components, the lenticular plate is positioned lenticule side up, smooth side down, directly upon and in contact with the printed side of the image carrier so that the axes of the lenticules in the lenticular plate run perfectly parallel to the image clusters printed on the image carrier. Special care must be taken during this registration process since even an axial misalignment of as little as a thousandth of an inch from one end of the card to the other can compromise the image clarity and, as a result, the optimal performance of the finished device. When exact alignment been achieved, the two layers are permanently adhered to one another using conventional means, resulting in the finished, assembled lenticular motion card.

When the assembled card is held motionless at arm's length, the lenticular surface decodes a specific set of coded image lines from the image clusters beneath it to display a single, coherent, stationary image to the eye. Then, as the card is slowly tilted, this first set of coded image lines is angularly and perpendicularly displaced in relation to the lenticules above it, and the next, adjacent set of coded image lines to come into view. Thus, the first still image effectively disappears from view and is replaced by the second image, then the third, and so on as the card continues to be tilted, resulting in the illusion of motion. The reason the sequence repeats itself as the card is tilted is that after the first set of image lines in a given set of image clusters is scanned, the next set of image lines in the adjacent image cluster is scanned, then at least a portion of the next. The reason the sequence can only repeat itself two and a half times is because only the image clusters that are in closest proximity to the lenticules over them can be viewed, specifically the image cluster directly beneath its overlying, corresponding lenticule, which is seen when the card is viewed straight on, and the two image clusters adjacent to it, one on either side, which are viewed when the card is tilted in either direction. When the card is tilted even farther, it is not possible to view any more image lines or clusters, and the displayed image becomes wholly indistinct.

Shortcomings of the Manually Operated Lenticular Motion Card. The manually operated lenticular motion card is the gold standard of animated coded image products because it is easily and instinctively manipulated simply by being tilted back and forth by the average user. It dependably displays a brief burst of limited animation. However, because this burst of animation is so brief, limited to cycling only two and a half times from one tilt extreme of the card to the other, the display of realistically-cadenced, forward-moving cycling animations for any appreciable duration of time is not possible. The problem is inherent in the construction and operation of the device itself: Because the lenticular surface is permanently adhered to and thus fixed in place upon the image carrier, the image clusters that can be obliquely viewed as the card is tilted are severely limited in number. Further, for the user to repeat this altogether too brief animation effect, he or she must reverse-tilt the card to the start position and repeat the tilting action.

To better illustrate, let us return to the example of the cycling galloping horse animation. As the card is tilted, the horse, visually indistinct at first, but becoming ever clearer and sharper as the face of the card is tilted more toward the observer, will appear actively to complete two and a half full, forward-moving gallops until the card is tilted so far that it becomes visually indistinct. Once the card has been tilted to its extreme, the user, wishing to see the horse gallop with forward motion again, must first reverse the tilt of the card back to the start position, which temporarily causes the image of the horse to apparently and unnaturally gallop backwards. In most cases, a typical user will instinctively rock such a card back and forth several times, making the horse gallop forward then backward, forward then backward, and so on. While briefly amusing, this constant, repetitive, and abrupt interruption of the user's innate expectation of continuous forward motion, sometimes referred to as a "suspension of disbelief," soon causes the user to lose interest in the device.

The present inventor has appreciated that, if the horse instead could be made to appear to gallop with a forward motion and a natural cadence for several seconds or longer without interruption, this sustained impression of realistic, convincing motion would deliver a dramatically more satisfying and superior experience to the user.

Shortcomings of Inventive Attempts to Solve this Problem. Those skilled in the art have long known that a lenticular motion device capable of delivering longer duration animation can be constructed if the two layers formed by the lenticular plate and the image carrier were kept separate and one made to move against the other, all the while maintaining axial registration and full contact with one another. In such a device, one layer would be caused to slide against the other in a direction generally perpendicular to the lenticules and image clusters of the layers. An animation in such a display can display continuously repeating animation cycling as long as one layer is physically moving in one direction against the other. Because such a display can always be viewed straight on by the observer during this sliding rather than being viewed at an increasingly oblique angle, the animating image itself will always appear extremely crisp and clear.

At first it would seem this could be easily achieved by simply furnishing the user with a lenticular plate and a separate paper-stock card imprinted with a coded image and instructing him to carefully slide one against the other to create the animated effect. However, this solution has been attempted and proven to deliver-less than satisfactory results. For instance, in the 1960's, the Abby Finishing Company in Brooklyn N.Y. produced a direct hands-on lenticular kit entitled "Monster Magic Action Cards", containing a single, standalone clear plastic lenticular plate to be employed with 24 interchangeable paper-stock cards, each imprinted with a coded image animation scene. The instructions on the box instructed the user to "Watch 'em Move" and to "place Magic Lens rough side up on picture and slide lens only." This product did not survive its initial introduction to the market. The present inventor, who has had the opportunity to play with an actual sample of the toy, has concluded that its failure in the market lay in the manufacturer's unrealistic expectation that the end user would possess the motor skills to manipulate the toy properly. As mentioned earlier, even a slight misalignment of a lenticular plate in relation to a printed card will compromise the animation effect.

While it may be possible for the average user of such toys to align the lenticular plate to the coded image card initially by, for instance, squaring up their corners together, it then proves extremely difficult or even impossible for them to slide manually against one another while maintaining axial alignment between the two. The resulting visual effect for the average user, therefore, rather than the pleasing display of a clear, smooth animation, is instead a visually incoherent, twitching mashup of two, three, or more of the encoded images at once.

In 2002, another direct, hands-on, manually operated lenticular animation device was invented with the intent of solving this problem. U.S. Pat. No. 6,357,153 to Gelardi for a Movable Display Multiple Image Tag and Key Chain reveals a spring-loaded, manually-slid image card layer housed within a slotted, lenticular-faced enclosure. To animate the image, the user is required to depress the spring-loaded coded image carrier, causing the printed image clusters on the carrier to move in a perpendicular direction relative to the horizontally-arranged lenticules. Like the "Monster Magic Action Cards" toy discussed above, however, Gelardi's invention did not succeed past its initial introduction to the market. The present inventor, who again had the opportunity to procure and manipulate an actual sample of Gelardi's device, has identified at least one reason why: While guides on either side of the device do effectively retain the two layers in substantial axial alignment during the sliding of one in a direction perpendicular to the other while providing enough distance of travel of the image carrier beneath the lenticular plate to display and repeat an animation cycle seven or eight times in unbroken succession, the average user does not possess the motor skills to depress the spring-loaded carrier at a slow enough speed to achieve the hoped-for, naturally cadenced animation.

Another potential problem with this device is that the fixed guides that run along the inside edges of the slot seek to retain the image carrier's axial alignment with the lenticular plate at all times, including when it is made to travel and when it is at rest. These two fixed edge guides are spaced the same distance apart as the image carrier is wide because their purpose is to make effective contact with the image carrier to guide both edges of the image carrier accurately as it travels between them. However, in reality, if simultaneous contact between the guides and the image carrier were actually made, the image carrier could not be made to slide freely back and forth because it would bind upon the guides. Thus, to permit the image carrier to slide freely, the guides must be positioned from one another at a distance slightly greater than the width of the image carrier to provide some degree of space, or play, between them and the edges of the image carrier. This play, no matter how small, prevents the guides from fulfilling their purpose of truly retaining the axial orientation of the image carrier when it is in motion or even when it is at rest. Even the slightest unintentional sideways force imparted upon the image carrier as it is manually slid between the guides can cause it to wander off-axis. The image carrier, thus thrown out of alignment with the lenticular plate, will thus deliver an animation effect that is visually compromised, such as by having two or more images visible simultaneously.

Still further, as practical experience has taught the present inventor, it is unreasonable to expect that a plastic device, such as one that might be injection molded, one day to be exactly the same size as one that manufactured another day. Many factors affect the expansion and contraction of an injection molded plastic part, some of them being the chemical makeup of the plastic used, the heat and pressure at which it is injected into its mold and, indeed, even whether the atmosphere in the injection-molding factory on any given day is dry or humid. It is, therefore, unlikely that a device with microscopic tolerance demands, such as certain of those known to the art, will remain consistent in size and performance from one manufacturing run to another. This problem is similarly manifest in relation to lenticular constructions wherein coded image carriers are intended to be fixed and the device tilted to achieve animation, such as in U.S. Pat. No. 6,070,350 to Fantone.

To illustrate this point using the above-referenced galloping horse animation, a horse in nature might be expected to gallop at the rate of a little over three full gallops per second, not dramatically faster or slower. Thus, as each image cluster in the printed encoded image of the horse represents a full gallop, to emulate this same natural galloping cadence in a lenticular device, the encoded image layer would need to be caused to travel the distance of three image clusters in one second. To achieve this cadence, because the lens count per inch in this and other lenticular devices must be so fine to deliver an image with sufficient resolution, the user, to achieve a natural cadence of animation, would be required to depress the spring loaded image carrier at the extremely slow speed of approximately one tenth of an inch per second and to sustain this movement steadily for several seconds. Even for one knowledgeable in the art, such as the present inventor, it proves extremely difficult or even impossible to manually depress the spring-loaded image carrier at such a slow and steady speed. While at rest, the still image in the display appears sufficiently sharp and vivid. However, when the device is set into motion by the average user, the resulting visual effect, rather than that of fluid, realistic animation, is instead that of a rapidly twitching, unclear image.

Manually Operated Mechanical Solutions. Other inventors, including the present inventor, have devised what may be referred to as manually operated mechanical animated coded image devices. These have proven to dependably display appreciably continuous, realistically-cadence animation and, as a result, have enjoyed worldwide success. The most popular ones, which include this inventor's U.S. Pat. Nos. 7,151,541, 6,843,009 to Kainen, and others, employ, in part, a hinged lever mechanism that is activated to slide the image carrier slowly and steadily beneath a decoder plate, such as a barrier grid or a lenticular plate, in a direction perpendicular thereto. To be complete, it will be noted that such devices relying on mechanisms to impart animation may not be strictly considered direct, hands-on, manually-operated devices like the manually operated lenticular motion card, and will again be noted that the enduring success of the manually operated lenticular motion card may largely derive from its simple, direct, hands-on operation. U.S. Pat. No. 7,151,541 is incorporated herein by reference as are U.S. Pat. Nos. 5,901,484 and 7,331,132, all to Rufus Butler Seder.

In view of the foregoing background, it is apparent that there is a long-felt need in the art of coded image animation for a simple, direct, hands-on, manually-operated device capable of displaying clear, reliable, realistically-cadenced, continuously cycling animations of appreciably long-lasting duration.

In proposing a solution to the foregoing need, methods and devices are shown and described herein with coded images and image decoding elements, such as lenticules or shutter elements, disposed at a tilted angle to control the speed of animation as a coded image card is slide in relation to a coded image viewer. However, the present inventor has also appreciated that it would be further advantageous not only to permit such animation by sliding movement but also to enable animation by a rocking pivoting of the coded animation card and coded image viewer combination.

SUMMARY OF THE INVENTION

With an appreciation for the needs in the art of coded image animation developed over many years of invention and development, the present inventor set forth with the fundamental objects of providing a manually-operated coded image device operable by direct, hands-on actuation to display clear, reliable, realistically-cadenced, and continuous cycling animation of appreciably long-lasting duration.

In certain embodiments, a further object of the invention is to enable the coded image animation device not only to permit such animation by a sliding movement of a coded image card in relation to a coded image viewer but also to enable animation by a rocking pivoting of the coded animation card and coded image viewer when retained together as a combination.

A related object of the invention is to provide a coded image animation device that permits a manually-induced, continuous rocking of the coded image card and coded image viewer of the coded image animation device to produce animation over a continuous period of rocking.

These and further objects, advantages, and details of manifestations of the present invention will become obvious not only to one who reviews the present specification and drawings but also to those who have an opportunity to experience an embodiment of coded image animation device disclosed herein in operation. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects, an embodiment of the present invention for a manually-operated coded image animation device is founded on a coded image viewer with a front panel with a first end and a second end, an open-ended slot behind the front panel, and coded image decoding elements, such as lenticules, disposed on the front panel. A coded image card with a plurality of coded images retained on the coded image card can be manually inserted into the slot in the coded image viewer and slid in relation to the coded image viewer to cause the coded image decoding elements to decode the coded images on the coded image card.

The coded image viewer can further comprise a rear panel structure and a base member, and the base member can include a sliding surface for the coded image card. The base member can retain the front panel and the rear panel structure. At least one guide extension of the rear panel can be included to extend beyond the first end of the front panel to facilitate insertion of the coded image card. A coded image card with a plurality of coded images retained thereon has an edge for sliding along the sliding surface.

In practices of the invention, a biasing system can be incorporated for biasing the coded image card into face-to-face contact with the front panel. The biasing system can take the form of a spring bed and a pressure plate biased toward the front panel by the spring bed. A recessed area can be disposed within the rear panel structure with the spring bed retained within the recessed area.

Embodiments of the coded image animation device can be disposed at a diagonal angle. For instance, the coded image viewer can have a sliding surface that defines a bottom of the slot, and the diagonal angle of the coded image decoding elements can be measured with respect to perpendicular to the sliding surface.

The plurality of coded images retained on the coded image card can be disposed at a diagonal angle, and the diagonal angles of the coded image decoding elements and the coded images are substantially equal. With that, a rate of displayed animation of the coded images per unit movement of the coded image card in relation to the coded image viewer is controlled. In particular embodiments, the coded image decoding elements and the coded images retained on the coded image card are disposed at an angle of between 80 and 85 degrees from perpendicular to the to the sliding surface and the edge of the coded image card respectively.

In certain embodiments of the coded image animation device, a podium can be provided with the coded image viewer retained to rock rearward and forward in relation to the podium by manual activation to produce animation when a coded image card is disposed within the slot in the coded image viewer. In such practices, a lever arm and a counterweight structure can be provided with the coded image viewer retained by a proximal portion of the lever arm and the counterweight structure retained by a distal portion of the lever arm. With that, the coded image viewer, the lever arm, and the counterweight structure form a pivoting structure pivotably supported by the podium. The lever arm can pass through the slot, and a fulcrum for the pivoting structure can then pivotably support the pivoting structure in relation to the podium. In very particular embodiments of the invention, the pivoting structure can be calibrated to pivot at an angular velocity of between approximately 10.5 rpm and 11.5 rpm, even more preferably approximately 11.11 rpm.

In other practices of the invention, a coded image viewer has a front panel, a rear structure, a lower rail, and an upper rail. The upper rail has a sliding surface disposed in parallel opposition to a sliding surface of the lower rail, and a channel with a first end and a second end is defined between the front panel, the rear structure, the lower rail, and the upper rail. Coded image decoding elements disposed on the front panel. With that, a coded image card with a plurality of coded images retained on the coded image card can be manually inserted into the channel in the coded image viewer and slid in relation to the coded image viewer to cause the coded image decoding elements to decode the coded images on the coded image card.

In embodiments of the coded image animation device, the podium has an upper platform formed by a posterior platform section and an anterior platform section with the slot disposed through the upper platform of the podium. It is disclosed that the anterior platform section can be raised as compared to the posterior platform section whereby a raised lip is disposed at a junction where the posterior platform section meets the anterior platform section. The slot is contiguous with the raised lip. The slot can have a posterior edge defined by the posterior platform section and an anterior edge defined by the anterior platform section wherein the anterior edge of the slot is formed with an undercut chamfer so that a rearwardly sloped surface is presented.

The pivoting structure in certain embodiments is balanced so that, when not rocking, the front panel is disposed at a rearward resting tilt angle from vertical. To promote rocking of the pivoting structure at a calibrated angular velocity, the counterweight structure has a central opening, an anterior mass of high-density material retained anterior to the central opening, and a posterior mass of high-density material retained posterior to the central opening. In very particular embodiments of the invention, the pivoting structure can be calibrated to pivot at an angular velocity of between approximately 10.5 rpm and 11.5 rpm, even more preferably approximately 11.11 rpm.

The foregoing discussion broadly outlines certain more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention. It will thus be clear that additional features and benefits of the invention will be apparent through a reading of the detailed description of implementations and embodiments, which are without restriction, and by reference to the attached figures.

BRIEF DESCRIPTION OF THE DRAWINGS

The present invention will be described and explained with additional specificity and detail through reference to the accompanying drawings wherein:

FIG. 1 is a view in front elevation of a manually-operated coded image animation device according to the invention disclosed herein;

FIG. 10 is a further exploded perspective view of the coded image viewer;

FIG. 11 is an exploded view in side elevation of the coded image viewer;

DETAILED DESCRIPTION OF PREFERRED EMBODIMENTS

The manually-operated coded image animation device disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 3:
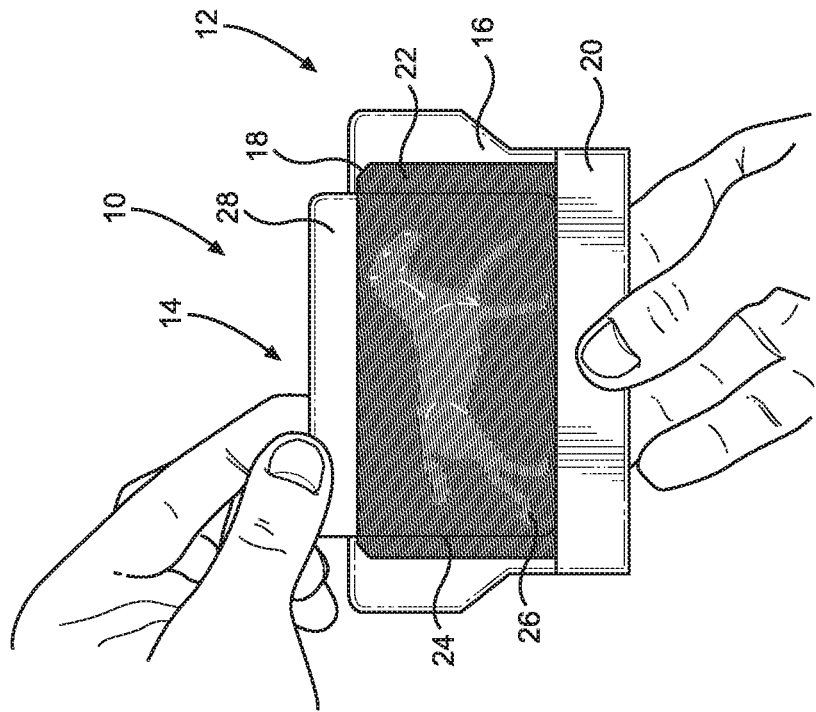
FIG. 3 is a view in front elevation of the manually-operated coded image animation device with the coded image card fully inserted into the coded image viewer.
Figure 2:
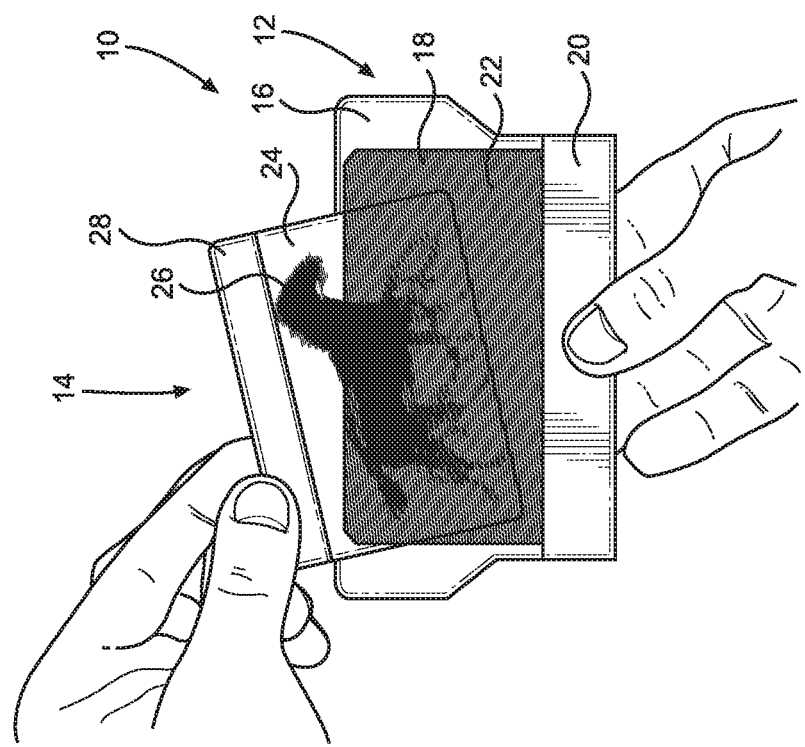
FIG. 2 is a view in front elevation of the manually-operated coded image animation device during an insertion of a coded image card into a coded image viewer.

An embodiment of the present invention for a manually-operated coded image animation device is indicated generally at 10 in the drawings. There, the coded image animation device 10 is founded on a coded image viewer 12 in combination with a coded image card 14. The coded image viewer 12 in this example comprises a compact, hand-held device with a rear panel 16, a front panel 18, and a base member 20 that retains the rear panel 16 and the front panel 18 in generally parallel planes. An open-ended slot can thus be considered to be defined between the front and rear panels 18 and 16. The slot is generally U-shaped. A sliding surface of the base member 20 defines a bottom of the slot. Under this construction, the coded image card 14 can be inserted into the slot between the front and rear panels 18 and 16 as shown, for instance, in FIGS. 2 and 3.

The front panel 18 is translucent, preferably transparent, and has decoding elements 22 disposed thereon. In this embodiment, the decoding elements 22 comprise lenticules, but other decoding elements, such as opaque shutter elements, are not excluded except as may be expressly done by the claims. The coded image card 14 has an animation portion 24, which can for instance be flat and of card stock or any other material, and an edge portion 28. Coded images 26 formed by a plurality of interposed coded image strips are applied to the animation portion 24 of the coded image card 14. The coded images 26 have an angular orientation with respect to the lower edge of the coded image card 14, and the decoding elements 22 have an angular orientation with respect to the sliding surface of the base member 20. The angular orientations of the coded images 26 and the decoding elements 22 can match.

Under this construction, the coded image card 14 can be fully inserted into the slot and manually swiped along the sliding surface and within the slot, such as at a rate of speed natural to the average user to display a fluid, realistically-cadenced, continuously cycling animation of appreciable duration. In such a coded image animation device 10, for example, a coded image card 14 bearing the encoded image 26 of a 6-phase galloping horse can be swiped in one direction through the coded image viewer 12 to cause the displayed horse to appear to gallop continuously with an unbroken stride and at a realistic cadence over the period of several seconds. Indeed, the horse of the coded image 26 could complete twelve full gallops or more in one manual sliding actuation. In practice, the coded image viewer 12 can, by way of a non-limiting example, be held stationary in one hand, while the coded image card 14, held in the other hand, is inserted into the slot and swiped between the front and rear panels 16 and 18 in a manner that could be considered similar to the way credit cards are swiped through terminal at store checkouts.

The rear panel 16 has first and second card insertion guide extensions that can, for instance, extend beyond first and second ends of the front panel 18, such as in the form of wings extending beyond the upper edges of the front panel 18. The extensions thus permit easy, accurate, and swift insertion of the coded image card 14 into the slot from either side. When the card 14 is fully inserted into the slot, the lower edge of the coded image card 14 naturally rests on the flat guide rail formed by the sliding surface to achieve and maintain alignment of the angular orientations of the coded image 26 relative to the decoding elements 22, which are in this embodiment formed by lenticules 22, as the coded image card 14 is manually swiped or slid in either direction behind the front panel 18, which here comprises a lenticular plate.

According to the invention, it is contemplated that different coded image cards 14 of countless different designs could be employed in relation to a given coded image viewer 12. With that, the coded image animation device 10 can be practiced in an entertaining and cost-effective manner. Efficiencies are further achieved by a relatively low production cost for coded image cards 14 according to the invention as compared to traditional manually operated lenticular motion cards that require a lenticular plate permanently adhered to each. Under the present invention, however, the coded image cards 14 are free from any individually-adhered lenticular plate and may be produced and printed using, by way of example, the same conventional methods and materials used to produce standard card-stock trading cards. It is contemplated that coded image cards 14 according to the invention could be similar or identical in dimensions to a standard trading card size of 2.5 inches by 3.5 inches with similar thickness.

The coded image viewer 12 in one practice of the invention can be formed from a polymeric material, such as plastic or any other suitable material or combination of materials, and can be approximately ¼ inch thick and approximately 3 inches in height and 5 inches in length. The slot in the coded image viewer 12 is open on three sides, which can be considered to the top, left, and right sides, and is deep enough to permit easy insertion and swiping of the coded image card 14 into and through it. The clear lenticular plate formed by the front panel 18 forms the front wall of the viewer 12, and the space between front panel 18 and the solid rear panel 6 forms the slot. The front panel 18 and the base member 20 could be separately formed. However, in the current embodiment, the front panel 18 and the base member 20 are integrally formed, such as by injection molding or any other method. The co-molding ensures that the sliding surface, which may alternatively be referred to as a register guide rail, has a consistent, predetermined distance relationship with the front panel 18 and the image decoding elements 22 retained thereby.

This coded image viewer 12 of the coded image animation device 10 has a biasing system, which in this embodiment comprises a pressure plate system, that biases the coded image card 14 into face-to-face contact with the front panel 18 thereby to promote, among other things, full surface contact of the coded image card 14 and the retained coded images 26 with the inwardly-facing surface of the front panel 18. Other biasing systems may occur to one skilled in the art after reviewing the present disclosure, and each is within the scope of the invention except as may be expressly excluded by the claims.

In the depicted embodiment and more particular reference to FIGS. 5 through 7C, the biasing system is carried forth by a pressure plate 34 in combination with a spring bed 40. The rear panel 16 has a recessed area 30 that is generally rectangular and is bordered over a portion of its periphery by a ridge structure 32. In this example, the ridge structure 32 traverses along an upper edge of the recessed area 30 and over a portion of the left and right ends of the recessed area 30. The spring bed 40 is disposed within the recessed area 30, and the pressure plate 34, which corresponds in rectangular shape to the shape of the recessed area 30, overlies the spring bed 40 so that the pressure plate 34 tends to be biased into contact with the inner surface of the front panel 18.

In the present embodiment, the spring bed 40 is formed from a resilient material, such as but not limited to a panel of flexible, thin plastic. A plurality of biasing formations 42, in this cases creases 42, are formed into the spring bed 40, and a plurality of convex ridges 44 of arcuate cross-section are interposed between the biasing formations 42. An underfolded flap can be disposed at each end of the spring bed 40. With this, the spring bed 40 forms a resilient bed substantially spanning the recessed area 30.

Figure 7A:
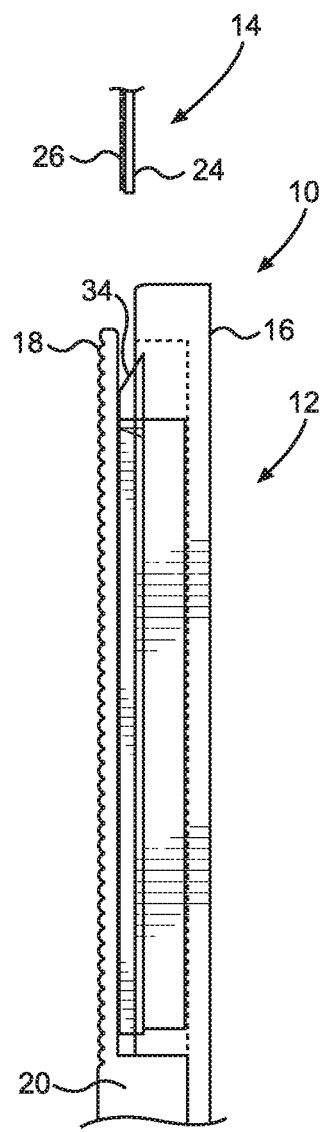
FIGS. 7A through 7C are partially sectioned views in side elevation of the coded image animation device during an insertion of the coded image card into the coded image viewer.
Figure 7B:
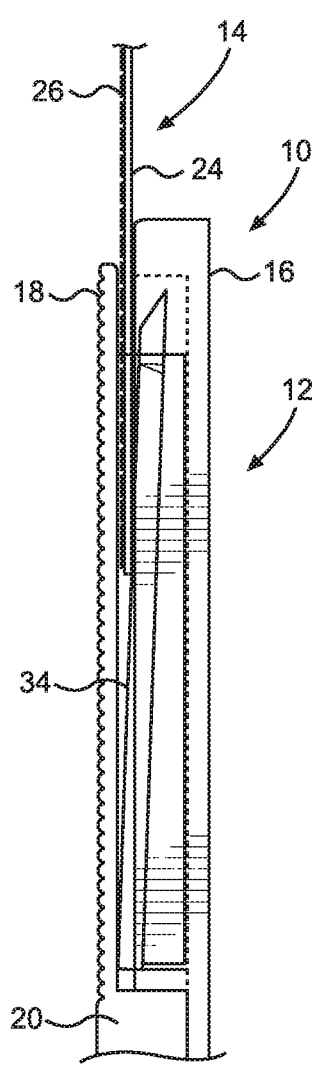
Figure 7C:
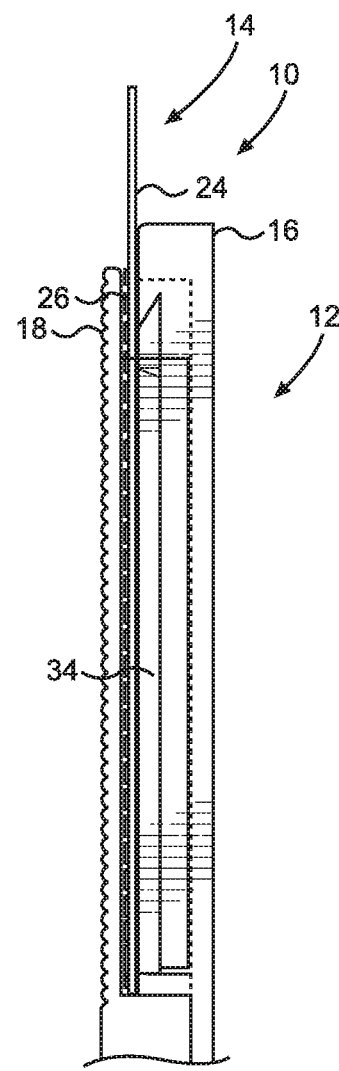

The pressure plate 34 is founded on a substantially rectangular plate 36 that has a peripheral edge structure 38 bordering at least a portion of its periphery. Here, the edge structure 38 traverses the upper edge and the first and second ends of the pressure plate 34. The pressure plate 34 can, for instance, be formed from a panel of material that can be flexible or rigid. In one embodiment, the panel of material comprises a panel of thin, flexible sheeting, such as plastic sheeting. The pressure plate 34 could, for instance, be efficiently produced from a vacuum-formed thin plastic panel. The edge structure 38 is formed in this manifestation with angled edge sections of the pressure plate 34 so that the edge sections forming the edge structure are disposed at an oblique angle to the main plate 36 of the pressure plate 34. With this, an alcove can be considered to be formed in the pressure plate 34. With the alcove facing toward the spring bed 40 and the rear panel 16, the angled edge structure 38 of the pressure plate 34 can overlie the edges of the spring bed 40 and, as FIGS. 7A through 7C show perhaps most clearly, can act as a sloped entryway to the slot between the front and rear panels 18 and 16.

The pressure plate 34 can be adhered to the spring bed 40 by, for example, a strip of double-sided tape 46 or any other effective fastening method. The spring bed 40 can be fastened to the rear panel 16 by any effective method, such as by double-side tape disposed with a first surface adhered to one of the underfolded flaps of the spring bed and a second surface adhered to the rear wall 16 of the coded image viewer 12. This advantageously permits the other end of the spring bed 40 to expand and contract in length when compressed or released, such as by insertion or removal of the card 14 in the viewer 12. The illustrated spring bed 40 has demonstrated the ability to provide sufficient force to retain the card 14 in contact with the front panel 18, which forms a lenticular plate in this construction, as the card is manually slid behind front panel 18 while yielding sufficiently to permit sliding without excessive drag.

The ridge structure 32 of the rear panel 16 corresponds in shape and size of the three exposed edges of the front panel 18. Its width is sufficient to bridge the area from a small distance within the perimeter of the front panel 18 to a boundary outside and beyond the edges of the front panel 18. Protruding outward beyond the edges of the front panel 18, the ridge structure 32 aids in the initial manual insertion of a coded image card 14 into the coded image viewer 12. The ridge structure 32 also at least partially houses and protects the biasing system formed by the pressure plate 34 and the spring bed 40 thereby, among other things, preventing jamming of the coded image card 14 against the biasing system as the card 14 is inserted into the slot. Still further, the ridge structure 32 assists the pressure plate 34 in retaining an inserted coded image card 14 in close contact with the inner surface of the front panel 18 as the coded image card 14 is manually swiped through the coded image viewer 12.

With the coded image animation device 10 so constructed, the spring bed 40 is effectively retained within the recessed area 30 of the rear panel 16 to impart biasing pressure on the pressure plate 34. When a coded image card 14 is not disposed in the coded image viewer 12, the pressure plate 34 tends to be biased into facing contact with the smooth inner surface of the front wall 18. When a coded animation card 14 is interposed between the pressure plate 34 and the front wall 18, the pressure plate 34 presses the coded image card 14 into full surface contact with the smooth back wall of the front wall 18 thereby placing the coded images 26 of the card 14 at the correct focal length behind the lenticules 22.

When the coded image viewer 12 is viewed in side elevation as, for instance, in FIGS. 7A through 7C, one can perceive the open-ended, U-shaped slot into which the coded image card 14 can be manually inserted. The space between the facing surfaces of the front panel 18 and the rear panel 16, which may be referred to as the depth of the slot, need not be precisely matched to the thickness of the coded image card 14 and may be slightly greater than the card 14 is thick. To ease in the insertion of the card 14 and to prevent scraping of the coded image 26, the inward edges of the front panel 18 can be rounded. Moreover, the angled edge structure 38 of the pressure plate 34 further deters jamming of the card 14 against the biasing system formed by the pressure plate 34 and the spring bed 40 during insertion of the card 14 into the slot. The angled edge structure 38 can have a depth greater than the depth of the gap between the surrounding raised ridge structure 32 and the back of the front panel 18. Thus, as a card 14 is inserted in the coded image viewer 12 as in FIGS. 7A through 7C for example, the leading edge of the card 14 initially engages the chamfered edge structure 38 of the pressure plate 34 to cause the spring-loaded pressure plate to deflect and retract to enable the card 14 to be slid fully into place between the pressure plate 34 and the front panel 18 and with the lower edge of the card 14 slidably disposed on the sliding surface of the base member 20.

It will again be noted that the spring bed 40 and pressure plate 34 combination is just one of many possible spring-loaded pressure solutions that may be employed. Further non-limiting examples include a molding of the pressure plate 34 from stiff plastic with resiliently compressible members, such as compression or tension springs, between the pressure plate 34 and the rear wall 16. In any event, it is preferred that sufficient pressure be applied to induce full surface contact between the front panel 18 and the coded image card 14 while yielding sufficiently to permit ready manual sliding of the card 14 through the coded image viewer 12. When the coded image card 14 is inserted in the slot, the spring bed 40 compresses to permit the pressure plate 34 to deflect. Once inserted, the coded image card 14 is held in full-face surface contact against the back of the lenticular plate formed by the front panel 18, which ensures that the coded image 26 on the card 14 will always be at the correct focal length required by the lenticules 22 as the card 14 is swiped through the viewer 12.

The sliding surface presented by the base member 20 at the bottom of the open-ended slot comprises a narrow, smooth, flat floor that acts as a register guide rail upon the bottom edge of the coded image card 14 where the card 14 naturally tends to seat and slide, governing the axial alignment of the card 14 with the lenticular plate of the front panel 18 as the card 14 is manually slid through the viewer 12. Simply by inserting the card 14, the user, who need not even be aware of the technicalities of operation for the device 10, naturally applies the necessary downward pressure to retain the card 14 in perfect axial alignment with the lenticular plate of the front wall 18 as he or she swipes it through the coded image viewer 12. Such manual placement and movement of the coded image card 14 is both natural and instinctive.

The Value of Diagonally-Biased Lenticules in the Device. Rather than running exactly horizontally as in a traditional manually-operated lenticular animation device, the decoding elements 22 formed by lenticules in the lenticular plate forming the front wall 18 are disposed at a predetermined, specifically calculated diagonal angle in relation to the sliding surface of the base member 20, which acts as an alignment mechanism for the coded image card 14 in combination with the lower edge of the coded image card 14. The coded images 26 on the coded image card 14 are disposed at a matching diagonal angle in relation to the lower edge of the card 14, which again acts as a portion of the alignment mechanism for the card 14.

This diagonal bias of the coded images 26 and the decoding elements 22 performs the crucial function of governing the rate of speed at which the animation is displayed. When the coded image card 14 is manually swiped through the viewer 12 at an instinctive, natural speed by the average user, the diagonal bias ensures that the animation will be displayed with a realistic cadence. The method of calculating the optimum angle at which the lenticular decoding elements 22 and the coded images 26 are biased is dependent on, among other things, the lens count of the lenticular plate of the front wall 18. In the illustrated example, the front wall 18 comprises a 30 lpi lenticular plate with the lenticules 22 tilted to an orientation angle 83.5 degrees to the right from vertical, alternatively referred to as an orientation angle away from the orthogonal to the longitudinal of the front wall 18, just 6.5 degrees from being horizontal and in alignment with the longitudinal of the front wall 18. The card 14 retains coded image clusters 26 that have a corresponding pitch and that run at the identical 83.5 degree angle away from the orthogonal to the longitudinal of the card 14.

Figure 4A:
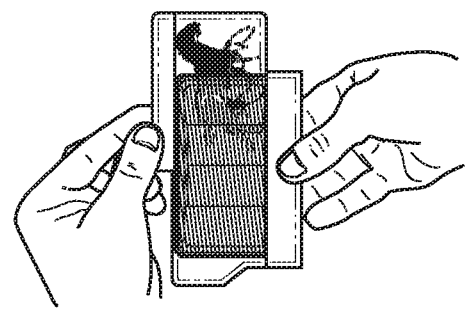
FIGS. 4A through 4D are sequential views in front elevation of the manually-operated coded image animation device during an insertion of the coded image card into the coded image viewer and during manual animation of coded images.
Figure 4B:
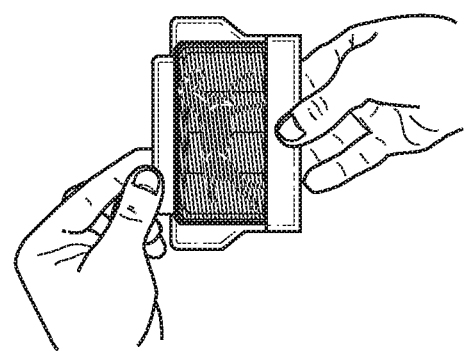
Figure 4C:
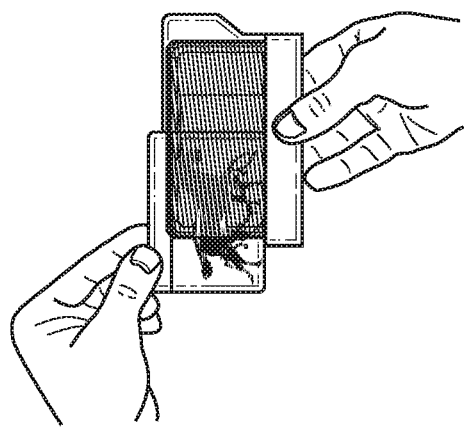
Figure 4D:
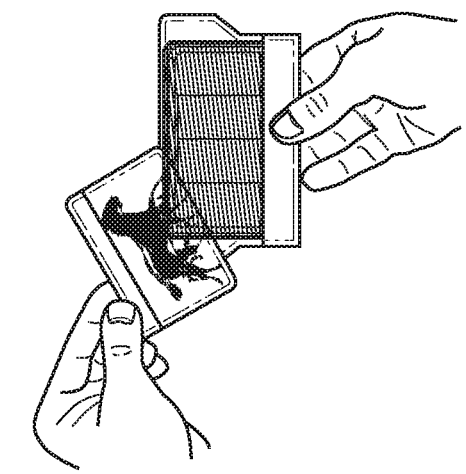
Figure 4E:
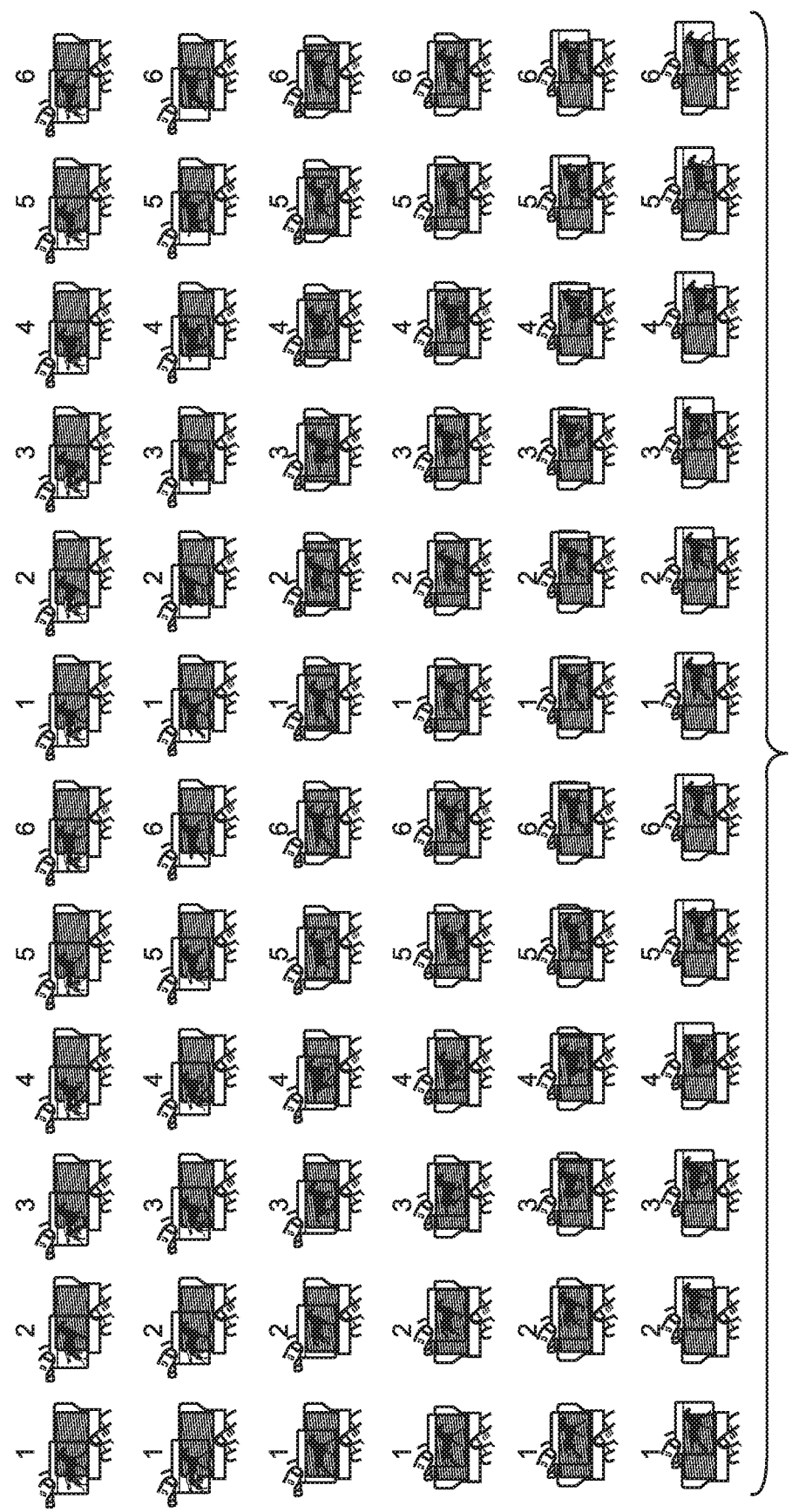
FIG. 4E provides sequential views in front elevation of plural cycles of animation with the manually-operated coded image animation device.
Figure 5:
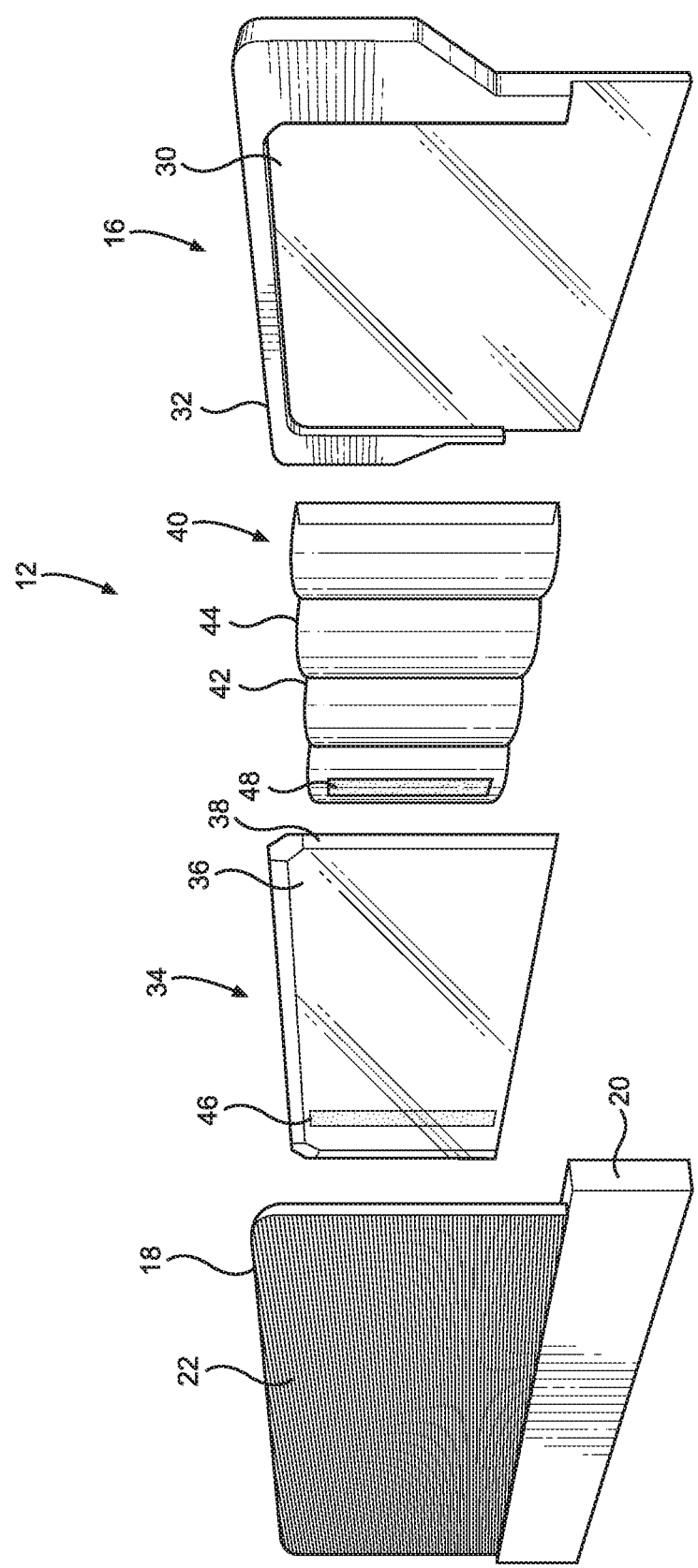
FIG. 5 is an exploded perspective view of the coded image viewer.
Figure 6:
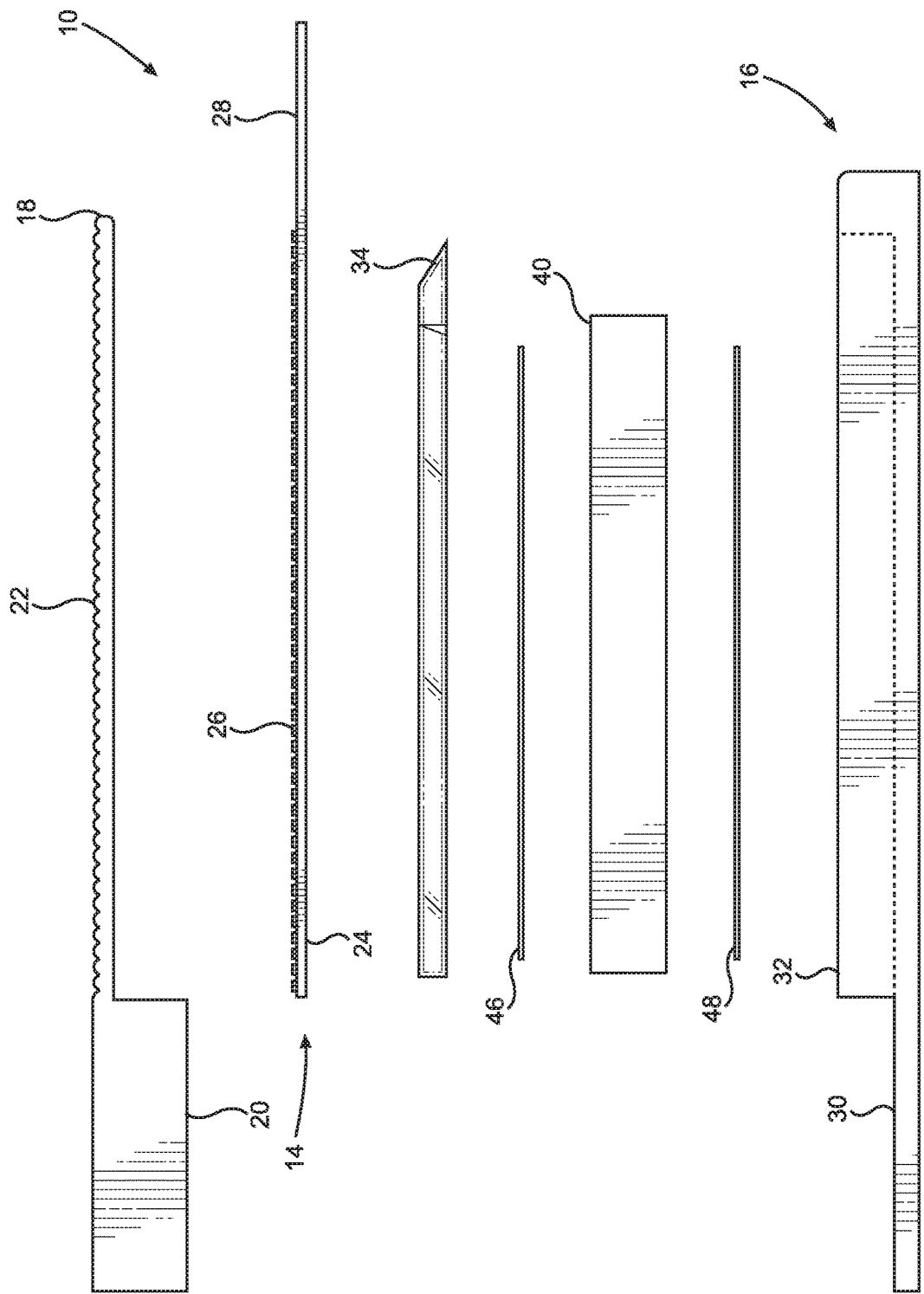
FIG. 6 is an exploded view in side elevation of the coded image animation device.

With the decoding elements 22 so angled, a coded image card 14 with coded images 26 depicting an animation cycle similarly angled that is manually swiped at a natural speed through the coded image viewer 12 while sliding along the horizontal guide rail of the sliding surface of the base member 20 as in FIGS. 4A through 4D will produce an animating image that animates smoothly and continuously at a realistic cadence of approximately three cycles per second. As shown in FIG. 4E, the cycle will uninterruptedly repeat twelve or more times over a period of four seconds or longer. The average user will be readily able to slide the card 14 through the viewer 12 at the appropriate rate of speed, which is approximately one inch per second. Depending on the animation being viewed, the user has the ability to slide the card 14 slower or faster to achieve the desirable cadence. This inventor has found that most repeat cyclical animations, such as running animals or walking figures, will appear to move realistically when cycled at the rate of between two to four cycles per second, and this is easily achieved by the average person using this device 10 with the decoding elements 22 and the coded images 26 so angled. For one who has had the opportunity to operate the disclosed coded image animation device, the display of realistically-cadenced, long-lasting animations, achieved through the direct, hands-on swiping of a card 14 through a viewer 12 delivers an immediate, rewarding, and delightful experience heretofore unparalleled by previous related lenticular motion devices.

The advantages produced by the diagonal angling of the coded images 26 and the decoding elements 22 would be lost if the coded images 26 and decoding elements 22 were disposed in alignment with the orthogonal to the longitudinal orientation of the respective card 14 and lenticular front panel 18 or aligned with that longitudinal orientation. To illustrate, if the lenticules 22 were disposed to align with the longitudinal of the front panel 18, horizontally when retained with the base member 20 communicating horizontally, similar to that of a traditional manually-tilted lenticular card, the lenticules 22 of the viewer 12 and the coded images 26 on the card 14 would not produce any animation when the card 14 is swiped laterally through the viewer 12 because there would be no displacement between the coded images 26 and the lenticules 22. Therefore, the result would be that only one still, unmoving animation phase would be visible during the entire sliding of the card 14 through the viewer 12. Alternately, if the decoding elements 22 and the coded images 26 were disposed vertically, perpendicular to the longitudinal orientation of the front panel 18 and the card 14, a card 14 manually swiped laterally through the viewer 12 by the user at a natural rate of speed would animate far too rapidly to be perceived as realistic animation. For example, using a 30 lpi lenticular front panel 18 arranged vertically, the six-phase galloping horse would appear to gallop thirty times for every inch the card 14 is manually slid through the viewer 12. With such a high rate of animation per unit movement, the average user could not be expected to be able manually to slide the card slowly and smoothly enough to display a normal galloping cadence for the horse. Further, the vertical disposition of the lenticules would likely create visual confusion for the observer because, at the average hand-held viewing distance of 15 to 20 inches, one eye would likely see a different image than the other eye.

The choice of the optimum angle for the lenticules 22 and the coded images 26 to govern the timed display of animations is critical. Many factors must be weighed and a compromise must be decided upon in making a choice for the exact diagonal angle for the lenticules 22 and the coded images 26. The more vertically-oriented the slant, the more cycles will be presented to the eye as the card 14 is slid through the viewer 12 but the more difficult it will be for the average user to slide the card 14 at a speed sufficiently slow or fast to display animation of a realistic cadence and the more confusing the resulting image will be to the two eyes, which may see different images at the same time. On the other hand, the more horizontally-oriented the diagonal slant, the easier it will be for the user to manually control the speed of swiping, but the number of times the animation will cycle per distance the card 14 travels will be fewer.

The present inventor has appreciated that a balance must therefore be found that permits display of as many repeating image cycles as possible while enabling an untutored user to swipe the coded image card 14 through the coded image viewer 12 at a natural, instinctive rate of speed, all to the purpose of delivering a realistically-cadenced, appreciably long lasting, animation. Through practical, empirical experiment and using a 30 lpi lenticular plate front panel 18 and printed coded image 26, the inventor has devised the table below specifying varying angles of tilt and how far a single encoded image cluster printed on a coded image card 14 must travel laterally beneath a single lenticule 22 to complete one full animation cycle.

TABLE

Animation Device with 1/30 (.8466 mm) Lenticle Width

| Angle | Lateral Travel for One Animation Cycle |
|---|---|
| VERTICAL (0 degrees): | 1/30" per cycle (.8466 mm): 30 cycles per inch |
| 45 degrees | 3/64" per cycle (1.19 mm), 21 cycles per inch |
| 55 degrees | .058" (1.48 mm), 17 cycles per inch |
| 57.86 degrees | 1/16" (1.5875 mm), 16 cycles per inch |
| 60 degrees | .067" (1.7 mm) per cycle |
| 67.5 degrees | 5.5/64" (1.9 mm) per cycle |
| 76 degrees | 9/64" (3.57 mm), 7 cycles per inch |
| 77 degrees | 0.149" (3.77 mm), 6.63 cycles per inch |
| 78 degrees | 5/32" (4.13 mm) 6.4 cycles per inch |
| 78.22 degrees | 0.164" (4.1666 mm), 6 cycles per inch |
| 80 degrees | 3/16 inches (4.87 mm), 5.3 cycles per inch |
| 83 degrees | .274 inches (6.95 mm), 3.6 cycles per inch |
| 83.5 degrees | **.294" (7.48 mm), 3.34 cycles per inch *** SWIPER** |
| 84 degrees | .318" (8.08 mm), 3.09 cycles per inch |
| 84.15 degrees | .328" (8.333 mm), 3 cycles per inch |
| 84.5 degrees | .347" (8.82 mm), 2.834 cycles per inch |
| 85 degrees | 3/8" (9.72 mm), 2.6 cycles per inch |
| 86 degrees | .479" (12.17 mm), 2 cycles per inch |
| 86.5 degrees | .547" (13.9 mm), 1.8 cycles per inch |
| 87 degrees | .639" (16.23 mm), 1.5 cycles per inch |
| 88 degrees | .955" (24.25 mm), just under 1 cycle per inch |
| 88.25 degrees | 1.092" (27.73 mm) just over 1 cycle per inch |
| 88.35 degrees | 1.158" (29.4 mm), .8 of a cycle per inch |
| 88.5 degrees | 1.736" (44.1 mm) .57 of a cycle per inch |
| 89 degrees | 1.91" (48.52 mm), approx. 1/2 cycle per inch) |

The 83.5 degree tilt highlighted above indicates the tilt angle this inventor has found optimum for a 30 lpi device that is intended to display the most cycles of fluid, realistically-cadenced animation when the user swipes the coded image card 14 through the coded image viewer 12 at an easily achievable rate of speed.

It will be understood that, if any other effect other than fluid animation is desired, a coded image animation device 10 with a different tilt angle may be preferable. For example, if the goal is to employ coded image cards 14 that display a simple transformation of one still image to another, such as a "flip" effect similar to that sometimes employed in manually operated lenticular motion cards, one may prefer to tilt the angle even steeper. If one wanted to ensure the average user complete, instinctive manual control over such a transformation, one might want the tilt to be 89 degrees, which, as indicated in the chart above, would permit a transformation of one image as the coded image card 14 is slid a full two inch distance in either direction within the slot of the coded image viewer 12. Thus, different applications and different manifestations of coded image animation device 10 that are intended to be handled differently by the average user may desirably employ diagonal image decoders 22, whether they be lenticules or shutter elements, and encoded images 26 of other specific angles to ensure the display of realistically cadenced animation in each unique situation.

It will again be understood that other embodiments of the coded image animation device 10 and the coded image viewer 12 and coded image card 14 are possible and within the scope of the invention. As noted, there are important advantages to providing a coded image viewer 12 that is open on three sides such that a coded image card 14 can be efficiently inserted therein and moved to produce animation. However, the present inventor has further understood that manifestations of the coded image viewer 12 may be advantageous with less flexibility between the front and rear panels 18 and 16 and in the coded image viewer 12 in general such that a more rigid and closed structure would be preferred.

Accordingly, the inventor has further devised of coded image animation devices 10 as depicted in the embodiment of FIGS. 8 through 17C wherein a guided channel is provided for slidably receiving a coded image card 14. Whereas the coded image card 14 could be effectively swiped through the coded image viewer 12 in the previously-described version, the coded image card 14 in this embodiment may alternatively be slid into place within the coded image viewer 12 and then moved, such as manually. By way of non-limiting example, the coded image card 14, when disposed between the rear panel 16 and the front panel 18 could be manipulated with the user's forefingers while his or her thumbs engage the front panel 18 as shown in FIGS. 16A through 16C. Pinching the coded image card 14 and the front panel 18, the coded image card 14 can be slid laterally to create the desired animation effect.

Figure 9:
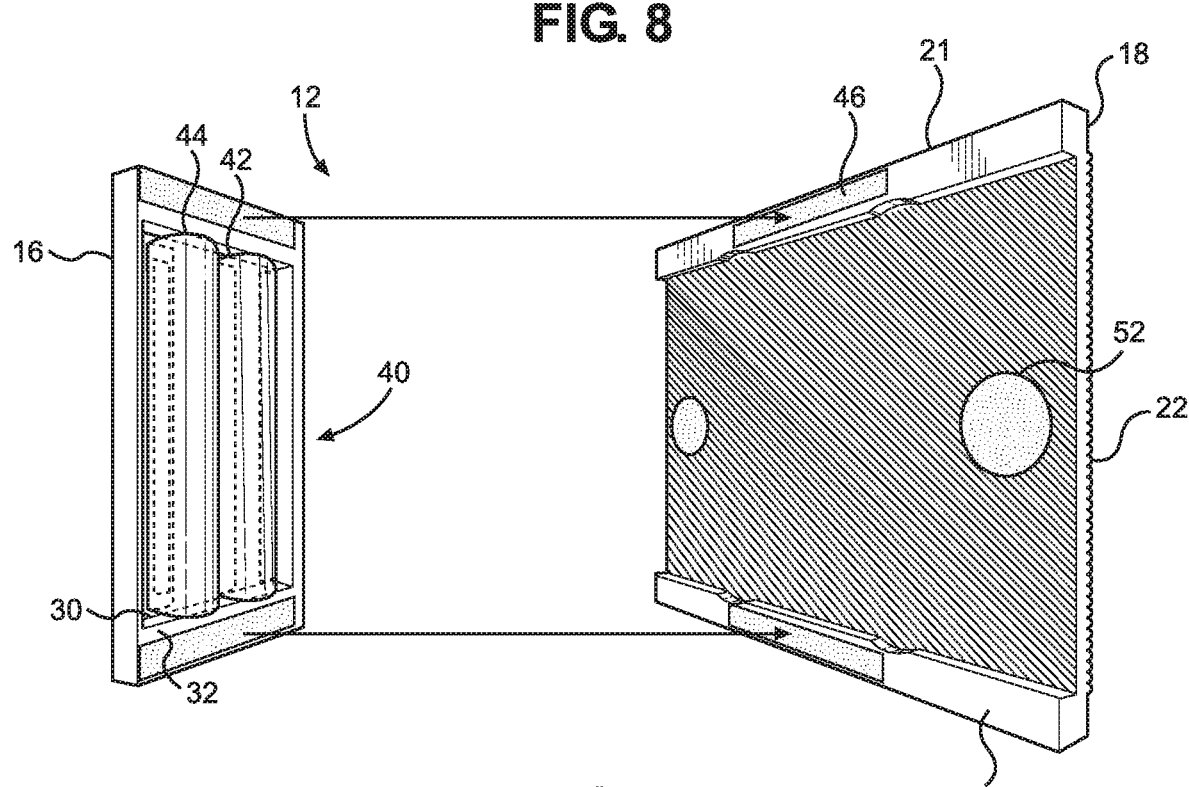
FIG. 9 is a partially exploded perspective view of the coded image viewer.

As shown in FIGS. 9 through 11, for instance, the coded image viewer 12 again has a rear structure 16 comprising a rear panel 16 and a front structure 18 comprising a front panel 18. The panels 16 and 18 are retained in generally parallel planes by a lower rail 20 that acts as a base member, also indicated at 20, and an upper rail 21 that acts as an upper member, also indicated at 21. The upper and lower rails 21 and 20 in this embodiment are formed integrally with the front panel 18, such as by molding. The upper and lower rails 21 and 20 have surfaces facing one another that are exactly in parallel. The rear structure 16 is affixed to the upper and lower rails 21 and 20 by any effective method, such as by adhesive, mechanical fasteners, sonic welding, a snap-fit engagement or any other effective method or combination thereof. So assembled, the front and rear structures 18 and 16 and the upper and lower rails 21 and 20 define a volume comprising a channel therebetween that is open at each end but bounded at its upper and lower edges by the upper and lower rails 21 and 20. With that, the upper and lower edges of the channel are exactly in parallel. The channel is generally rectangular in cross section. A sliding surface of the lower rail 20 defines a bottom of the channel, and a sliding surface of the upper rail 21 defines a top of the channel with the sliding surfaces disposed in a parallel relationship. Under this construction, the coded image card 14 can be inserted into the channel between the front and rear panels 18 and 16 and the upper and lower rails 21 and 20 as shown, for instance, in FIGS. 13 and 16A through 16C.

The front panel 18 is translucent, preferably transparent, and has decoding elements 22 disposed thereon. The decoding elements 22 again comprise lenticules, but other decoding elements, such as opaque shutter elements, are not excluded except as the claims may require. The coded image card 14 has an animation portion 24, which again can be flat and of card stock or any other material. Coded images 26 formed by a plurality of interposed coded image strips are applied to the animation portion 24 of the coded image card 14.

The coded images 26 have an angular orientation with respect to the lower edge of the coded image card 14, and the decoding elements 22 have an angular orientation with respect to the sliding surface of the base member 20. The angular orientations of the coded images 26 and the decoding elements 22 can match.

Figure 16A:
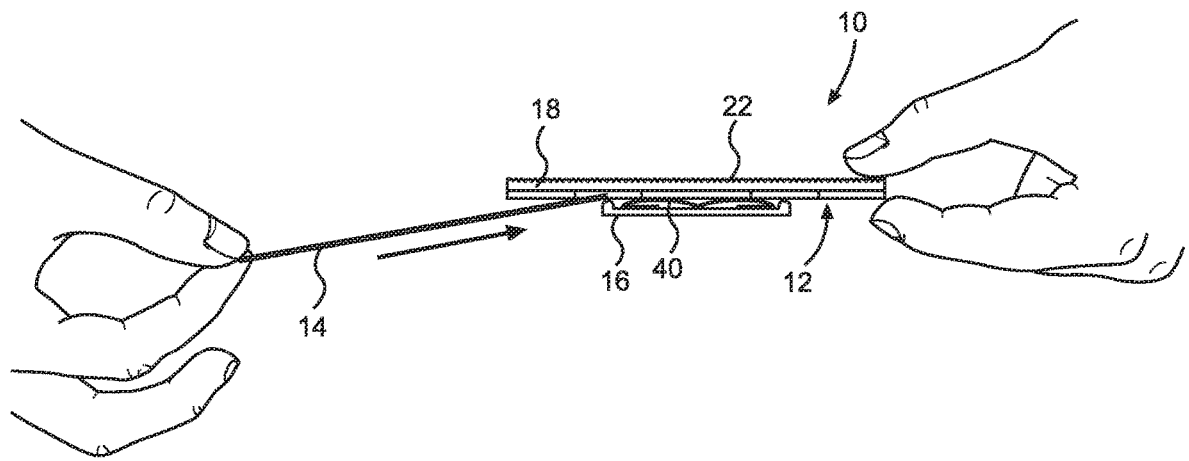
FIGS. 16A through 16C are sequential top plan views of a coded image card being inserted and otherwise manipulated in relation to the coded image viewer.
Figure 16B:
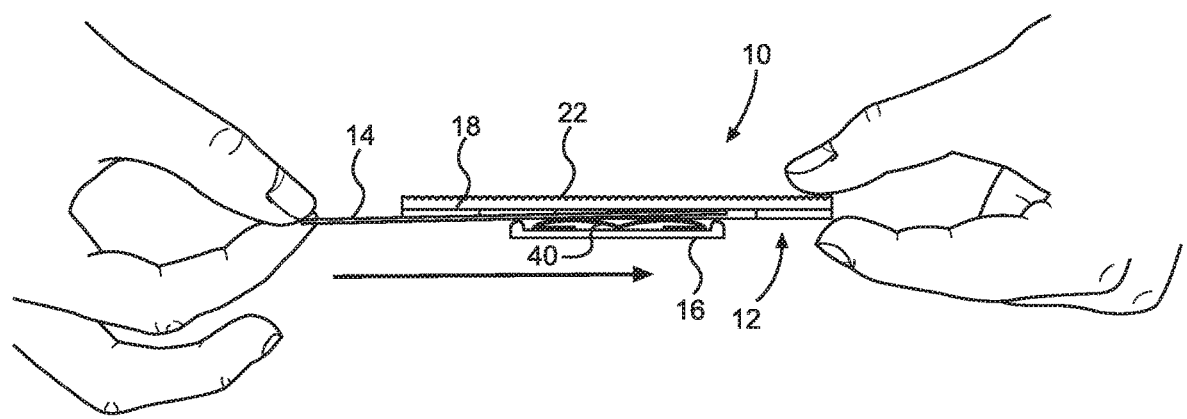
Figure 16C:
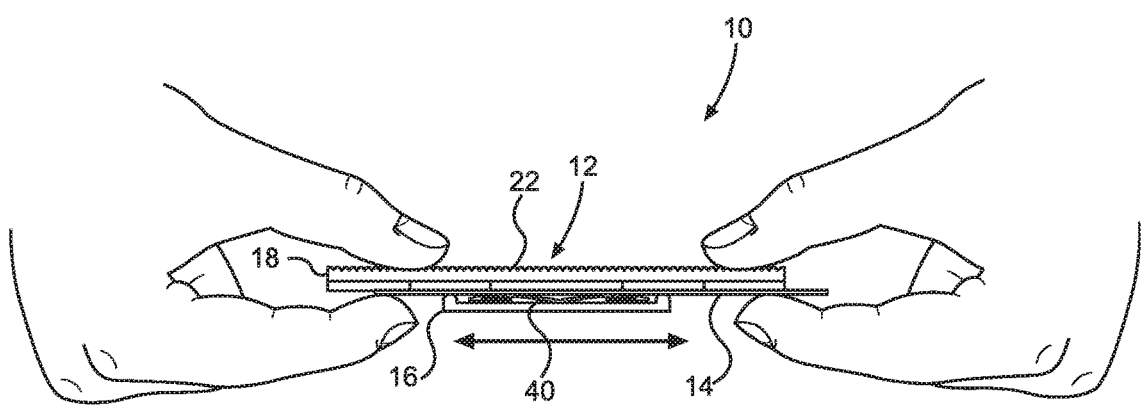
Figure 17A:
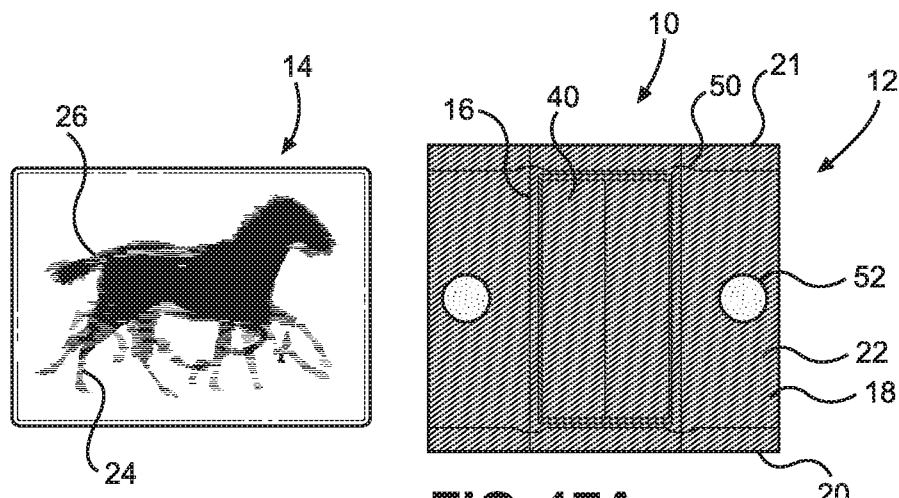
FIGS. 17A through 17C are sequential views in front elevation of the coded image card being inserted and otherwise manipulated in relation to the coded image viewer.
Figure 17B:
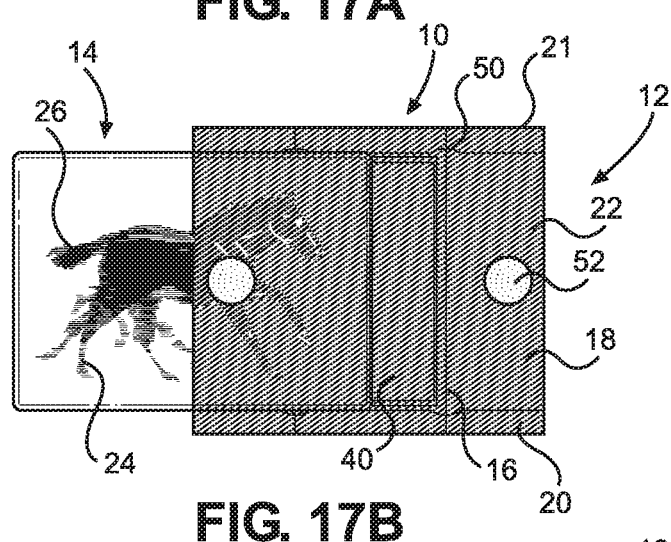
Figure 17C:
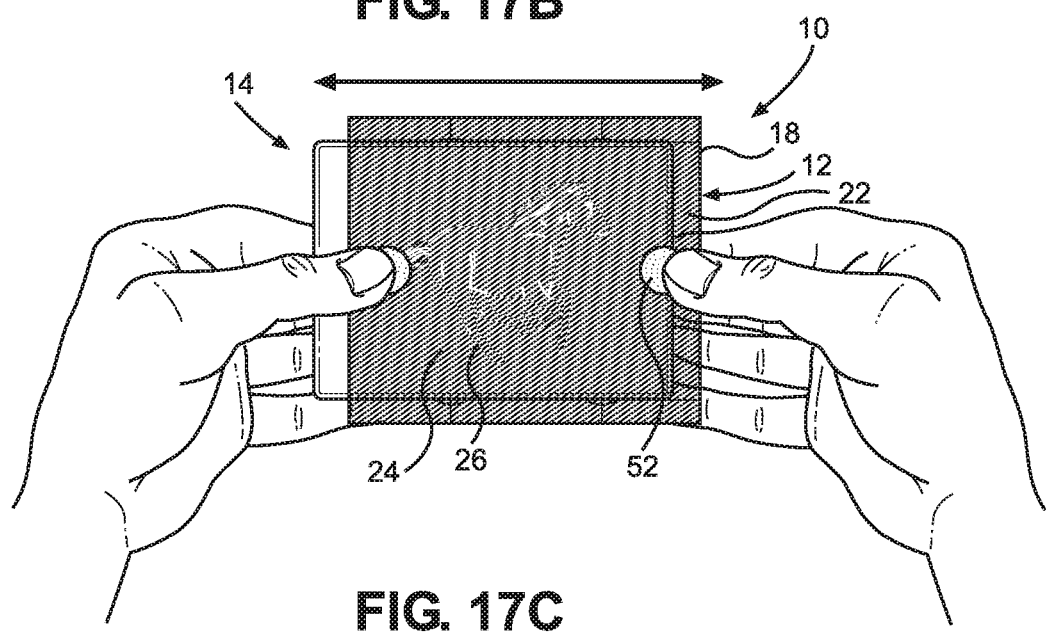

With the coded image viewer 12 so constructed and with further reference to FIGS. 16A through 16C, the coded image card 14 can be longitudinally inserted into the channel within the coded image viewer 12 with the upper and lower edges of the coded image card 14 closely bounded by the sliding surfaces defined by the upper and lower rails 21 and 20. Accurate registration between coded images 26 disposed on the coded image member 14 and decoding elements 22 disposed on the front panel 18 is automatically ensured by the close engagement of the edges of the coded image member 14 with the parallel surfaces defined by the rails 21 and 20. The coded image member 14 can thus be moved relative to the coded image viewer 12, such as by manual advancement of the same within the channel at a rate of speed natural to the average user to display a fluid, realistically-cadenced, continuously cycling animation of appreciable duration. For instance, a coded image card 14 bearing the encoded image 26 of a 6-phase galloping horse could be advanced in one direction through the channel in the coded image viewer 12 to cause the displayed horse to appear to gallop continuously with an unbroken stride and at a realistic cadence over the period of several seconds. Again, coded image cards 14 of infinitely varied designs could be employed in relation to the coded image viewer 12.

The coded image viewer 12 could, by way of non-limiting example, be formed from a polymeric material, such as plastic or any other suitable material or combination of materials. The clear lenticular plate formed by the front panel 18 forms the front wall of the viewer 12, and the space between front panel 18 and the rear panel 6 cooperates with the rails 21 and 20 to form the channel. The front panel 18 and the rails 20 and 21 could be separately formed, or the front panel 18 and the rails 20 and 21 and even the rear structure 16 could be integrally formed, such as by injection molding or any other method. The co-molding ensures that the sliding surfaces presented by the rails 20 and 21 can be formed in a precisely parallel relationship and with a consistent, predetermined distance relationship therebetween and with the front panel 18 and the image decoding elements 22 retained thereby.

A biasing system is provided to bias a coded image card 14 inserted into the channel into face-to-face contact with the inner surface of the front panel 18. The biasing of the coded image card 14 into contact with the front panel 18 promotes crisp, clear animation by promoting full surface contact between the coded image card 14 and the coded images 26 retained thereon and the surface of the front panel 18. The biasing system comprises what can be referred to as a pressure system, but other biasing systems may occur to one skilled in the art after reviewing the present disclosure each being within the scope of the invention except as may be expressly excluded by the claims.

Here, referring more particularly to FIGS. 9 through 11, for example, the biasing system is carried forth through a spring bed 40. The rear panel 16 has a recessed area 30 that is generally rectangular and is bordered over a portion of its periphery by a ridge structure 32 that traverses along upper and lower edges of the recessed area 30 and over the left and right ends of the recessed area 30. The spring bed 40 is disposed within the recessed area 30. Although not shown in this embodiment, a pressure plate corresponding in rectangular shape to the shape of the recessed area 30 could overlie the spring bed 40.

Figure 14:
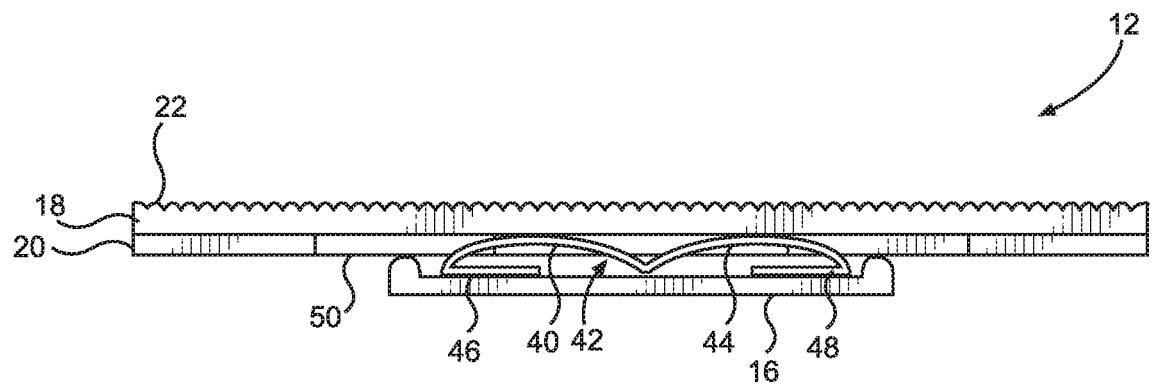
FIG. 14 is a top plan view of the coded image viewer.

The spring bed 40 is again formed from a resilient material, such as a panel of flexible, thin plastic. One or more biasing formations 42, in this cases one or more creases 42, are formed into the spring bed 40, and a plurality, specifically two in this manifestation, of convex ridges 44 of arcuate cross-section are interposed between the biasing formations 42. The convex ridges 44 thus effective form arched pillows that press toward the front panel 18. With this, the spring bed 40 forms a resilient bed substantially spanning the recessed area 30. As FIG. 14 shows, an underfolded flap can be disposed at each end of the spring bed 40. The spring bed 40 can be retained relative to the rear structure 16 by any effective retaining method or combination thereof. In this embodiment, the spring bed 40 is retained by an adhesive, such as an adhesive strip or an area of adhesive 46 or 48, interposed between one of the flaps of the spring bed 40 and the rear structure 16. The other flap and the contiguous portion of the spring bed 40 are essentially free floating to be able to deflect most effectively.

The spring bed 40 is effectively retained within the recessed area 30 of the rear panel 16 to impart biasing pressure toward the front panel 18. When a coded image card 14 is not disposed in the coded image viewer 12, the ridges 44 of the spring bed 40 tend to be biased toward the smooth inner surface of the front panel 18. When a coded animation card 14 is interposed between the spring bed 40 and the front wall 18, the pressure plate 34 presses the coded image card 14 into surface contact with the smooth back wall of the front panel 18 thereby placing the coded images 26 of the card 14 at the correct focal length behind the lenticules 22. Furthermore, during manual usage of the coded image animation device 10 as taught herein, the user exerts a further biasing force pressing the coded animation card 14 into facing contact with the front panel 18. The coded images 26 thus tend to be maintained at the exact and correct focal distance behind the lenticules 22 thereby to promote a focused, clear animating image.

The rear structure 16 in one embodiment comprises a ⅛ inches thick rectangle that is 1.5 inches wide by 3 inches high with a 1/16 inch deep rectangular recess 30 centered on one side. The recess 30 measures 15/16 inches wide by 2⅜ inches high. The top and bottom edges of the recess 30 are slight closer together than the opposed slide surfaces of the guide rails 20 and 21. As such, the recess 30 operates to retain the coded animation card 14 in proximity to the rear surface of the front panel 18 as the card 14 is slid through the channel without catching on the inside of the left or right edges of the recess 30.

Figure 8:
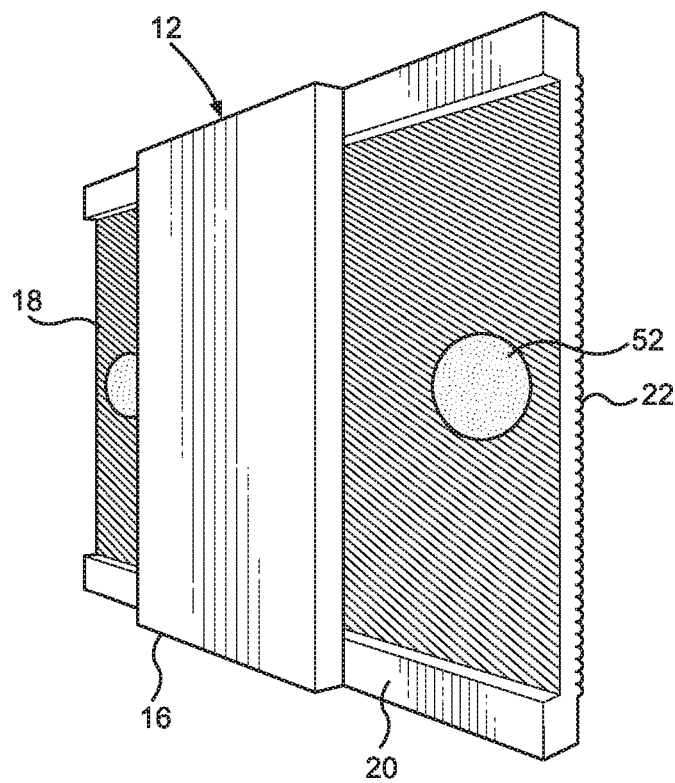
FIG. 8 is a perspective view of an alternative coded image viewer.
Figure 13:
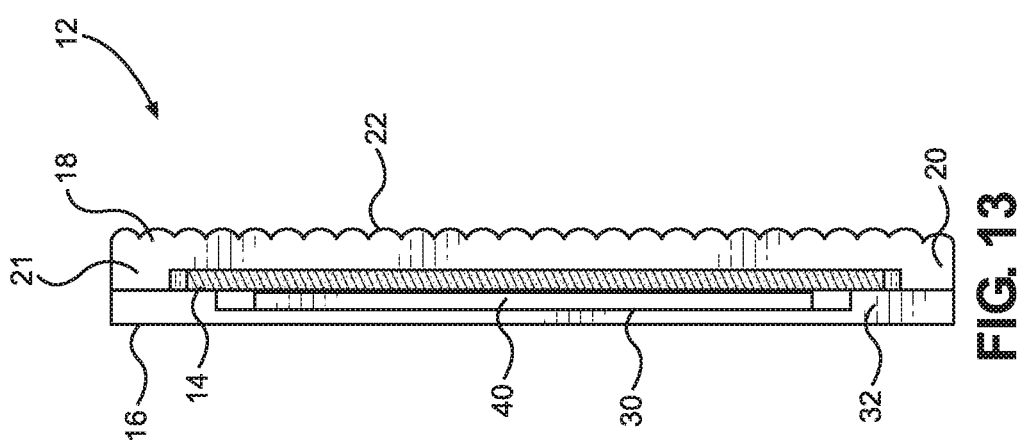
FIG. 13 is a view in side elevation of the coded image viewer retaining a coded image card.
Figure 15:
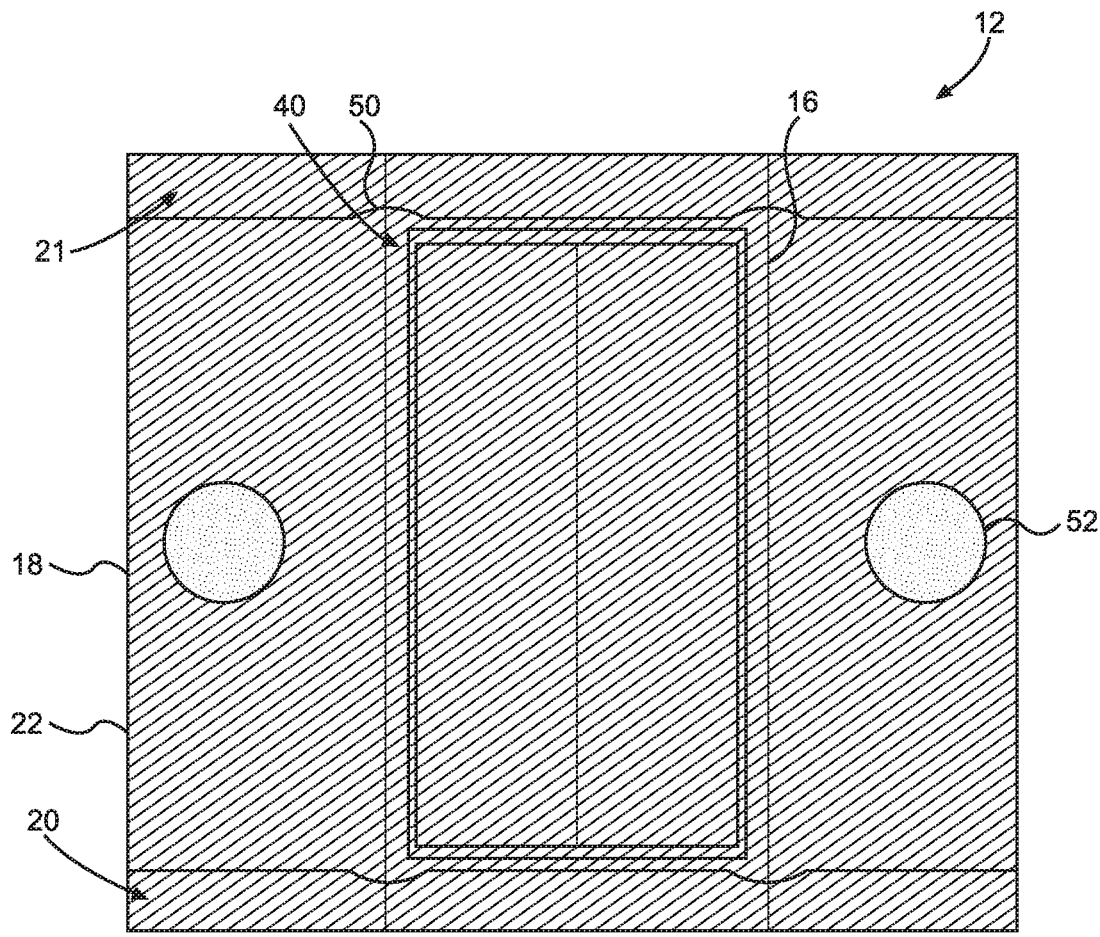
FIG. 15 is a view in front elevation of the coded image viewer.

As shown, for instance, in FIGS. 8, 13, and 15 and elsewhere, the rear panel structure 16 is narrower end to end longitudinally in comparison to the length of the front panel 18 from end to end. The rear panel structure 18 is fixed to the rails 20 and 21 of the front panel 18 in a centered position so that left and right portions of the front panel 18 extend beyond the ends of the rear panel structure 16, which facilitates insertion and manipulation of the coded image card 14 as suggested by FIGS. 16A through 16C for example. To that end, the coded image animation device 10 has indicators 52, specifically "thumb" markings 52, on the portions of the front panel 18 extending beyond the lateral edges of the rear panel structure 16 suggestive of where a user can place his or her thumbs on the front panel 18 while using his or her forefingers to slide the coded image card 14 laterally within the channel between the panels 16 and 18 as seen in FIGS. 16A through 16C and 17A through 17C. Carrying forward the dimensions of this exemplary embodiment, the rear and front panel structures 16 and 18 cooperate to create channel therebetween that is 1/16 inch deep and 2.5 inches high for receiving a coded image card 14 in a slidable relationship.

Figure 12:
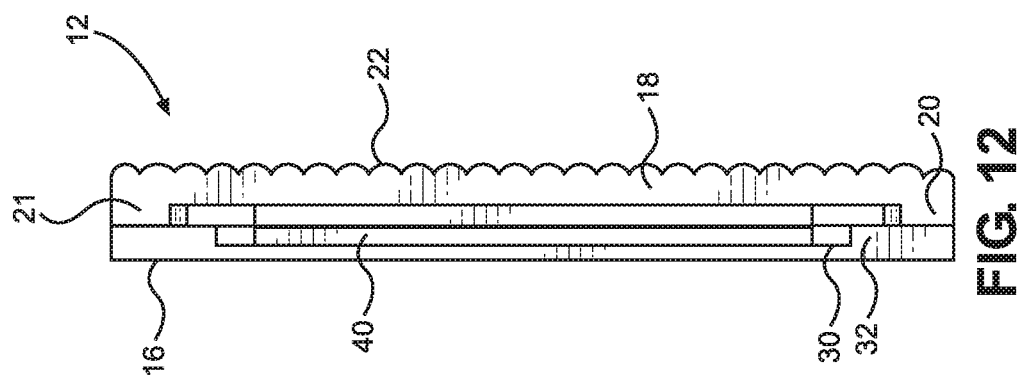
FIG. 12 is a view in side elevation of the coded image viewer.

When the coded image viewer 12 is viewed in side elevation as, for instance, in FIGS. 12 and 13, one can perceive the open-ended channel into which the coded image card 14 can be manually inserted. The space between the facing surfaces of the front panel 18 and the rear panel 16, which may be referred to as the depth of the channel, need not be precisely matched to the thickness of the coded image card 14 and may be slightly greater than the card 14 is thick.

As previously shown and described herein, the image decoding elements 22 on the front panel 18, which again can be lenticules, and the coded images 26 on the coded animation card 14 can be disposed at an angle of tilt between being disposed perpendicularly in relation to the surfaces of the rails 21 and 20 and the edges of the card 14, which would produce rapid phase change, and being disposed parallel to the surfaces of the rails 21 and 20 and the edges of the card 14, which would produce no animation. The preferred angle of tilt of the image decoding elements 22 and the coded images 26 will promote a natural cadence to the animation when the user naturally slides the card 14 in either direction.

It is perceived by the present inventor that the image decoding elements 22 and the coded images 26 may not need to be canted as steeply as was determined to be preferable in the embodiment of FIGS. 1 through 7C. This is because, rather than a potentially rapid sliding, the coded image card 14 in the present embodiment can be actuated by a manual pinching and sliding of the card 14 between the user's thumbs and forefingers, which permits far greater control over the speed at which the card 14 is advanced as compared to the swiping method. With this, the image decoding elements 22 in the present embodiment can be more steeply disposed, closer to vertical in relation to the rails 21 and 20 and the longitudinal edges of the card 14, to permit the display of a larger number of animation cycles per dimension of travel of the card 14. By way of non-limiting example, the slotted version of FIGS. 1 through 7C has been found advantageously to employ a 30 lens-per-inch or lenticule-per-inch (lpi) lenticular panel 18 canted at an 83.5 degree angle to deliver 3.3 cycles of animation for every inch of card travel. In the present embodiment where a channel is presented for receiving the coded image card 14, it has been determined that a 30 lpi lenticular screen may be canted at a 55-degree angle from vertical to deliver 17 repeat cycles of animation for every inch of card travel. In actual practice with this embodiment of the coded image animation device 10, the average user is likely to slide the card 14 a distance of approximately one half inch in each direction, causing the animated image of a galloping horse, for example, to gallop about eight or nine times smoothly and continuously in either direction, first forward, then backward.

The inventor has determined that the average adult user is capable of easily sliding the card 14 through such an animation device 10 at a slow enough speed to achieve realistic animation cadence. However, it is recognized that for some, such as children not possessing the motor control to slide the card 14 that slowly, it may be desirable to cant this 30 lpi screen even steeper than 55 degrees so that the image decoding elements 22 are at, by way of non-limiting example, at 67.5 degrees, which will further slow the rate of cycle repeat to about 12 cycles per inch of card travel. At this angle, the user can see the horse complete six continuous gallops without interruption during their sliding of the card a half inch in either direction. This inventor has determined that the display of six repeating, uninterrupted cycles of most animations at a natural cadence are sufficient to convey a remarkably convincing impression of realistic motion to the observer.

In certain practices of the invention, the coded image animation device 10 can be 3 inches high and can correspond in width to that of a conventional trading card, which is 2.5 inches high x 3.5 inches wide. The two guide rails 20 and 21, which protrude from and run along the upper and lower edges of the inner surface of the front panel 18, can be approximately 1/16" deep.

Apart from the angular disposition shown and described herein, the optical surface of the front panel 18 can otherwise be composed of a generally conventional lenticular array. This inventor has determined that an array of 30 lpi or 40 lpi are preferable for the devices 10 disclosed herein, including in that any lpi count less than 30, at the small scale of preferred embodiments delivers a low resolution image. Conversely, while a significantly higher lpi count than 40, such as 50 or 60 lpi, would in theory deliver an excellent high-resolution image the alignment between the card 14 and the image decoding elements 22 would become so critical as to exceed tolerances achievable during manufacture.

According to embodiments of the invention, the facing edges of the guide rails 20 and 21 along which the coded image card 14 will slide can incorporate scalloped concavities or divots 50 spaced therealong as seen, for instance in FIG. 15. For example, there can be two divots 50 in each guide rail 20 and 21 with half of each divot 50 underlying the rear panel structure 16. The divots 50 aid the user with the preliminary insertion of the card 14 between the rear panel structure 16 and the front panel structure 18. Once the card 14 is inserted and pushed into position behind the front panel structure 18, the spring bed 40 will naturally cause the card 14 to seat itself exactly between the rails 20 and 21 longitudinally to permit smooth movement left and right within the channel of the coded image viewer 12.

The present inventor recognizes that, for the animating image to be clear, the coded images 26 on the coded image card 14 must be in exact alignment with the image decoding elements 22 and simultaneously in full face to face contact with the rear of the front panel 18. To achieve this, the opposing surfaces of the guide rails 20 and 21 must be perfectly parallel to one another and spaced so that their inside edges are spaced by exactly the height of the coded image card 14 potentially with a marginal additional spacing to prevent binding or bowing of the card 14 while concomitantly preventing highly undesirable wiggling and misalignment.

For optimal performance of the animation device 10 with first and second guide rails 20 and 21, therefore, the stock for the coded image cards 14 must be accurately and identically cut with parallel top and bottom edges, which may be considered its longitudinal edges, at a fixed height. To match conventional trading cards, this would be a height of 2.5". Further, the rails 20 and 21 should be fixed to have their facing surfaces upon which the coded image cards 14 slide perfectly in parallel and spaced fractionally farther apart than the exact height of the coded image cards 14 to permit smooth, unbowed sliding while minimizing wiggling.

Additionally, the image decoding elements 22, such as the lenticules 22, and the corresponding printed coded images 26 on the card 14 will preferably be in the range of 30 to 40 lpi to be able to overcome slight misalignment while still providing a sufficiently distinct image. It is also essential to the performance of the coded image animation device 10 that the angular relationship of the lenticules 22 to the guide rail or rails 20 and 21 be precise and consistent in manufacture. Even a small misalignment will be magnified exponentially by the lenticules 22 thereby resulting in distorted animations or even the failure to animate at all.

Furthermore, in preferred embodiments of the coded image animation device 10, the rail or rails 20 and 21 will be formed unitarily with the front panel 18 to ensure precise angular positioning of the rails 20 and 21 relative to one another and relative to the image decoding elements 22 and the coded images 26. While it has been customary for manufacturing of lenticular devices to rely on die cutting the lenticular component from a large sheet of extruded material, such methods would likely be difficult to carry out with the precision and consistency required for the present coded image animation device 10.

This need for precise relative positioning of the rails 20 and 21 refocuses attention on the advantages of the slotted embodiment of the coded image animation device 10 of FIGS. 1 through 7C. There, with just the one guide rail 20, swiping the card 14 through the slot naturally results in a downward pressure to force the bottom edge of the card 14 into alignment with the single guide rail 20 and ensuring perfect alignment of the card 14 and the coded images 26 thereon in relation to the image decoding elements 22 of the front panel 18.

In view of the challenges presented by a two-rail coded image animation device 10, embodiments are contemplated, although not shown, wherein one of the rails 20 or 21, such as the top rail 21, can be spring-loaded to be biased toward the opposing rail 20 or 21 and thus against the edge of the card 14. The card 14 is thus pressed into alignment with the opposing guide rail 20 or 21.

Figure 18A:
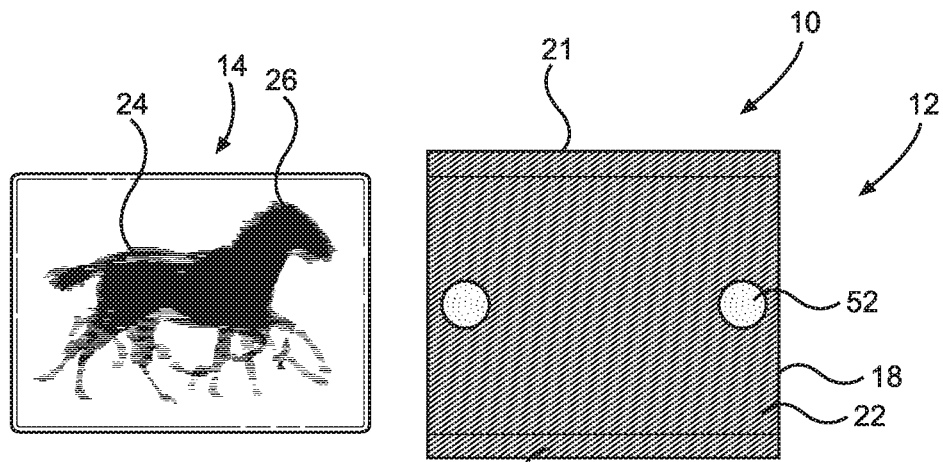
FIGS. 18A through 18C are sequential views in front elevation of a coded image card being inserted and otherwise manipulated in relation to another alternative embodiment of the coded image viewer.
Figure 18B:
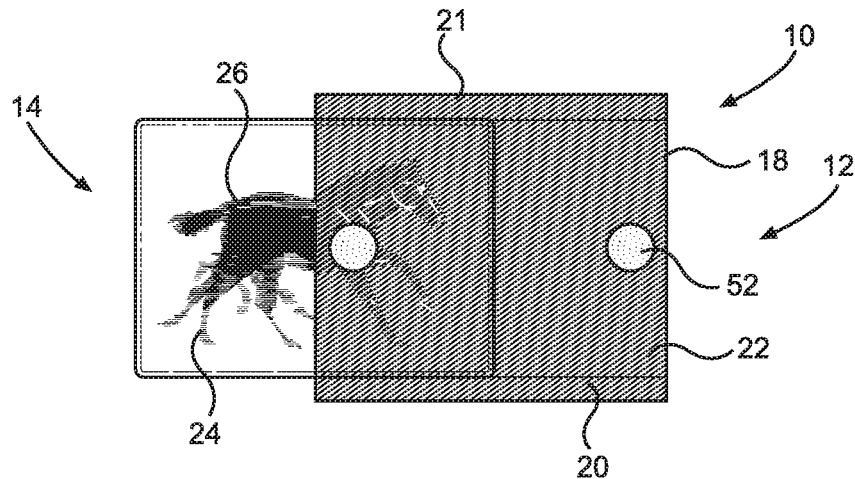
Figure 18C:
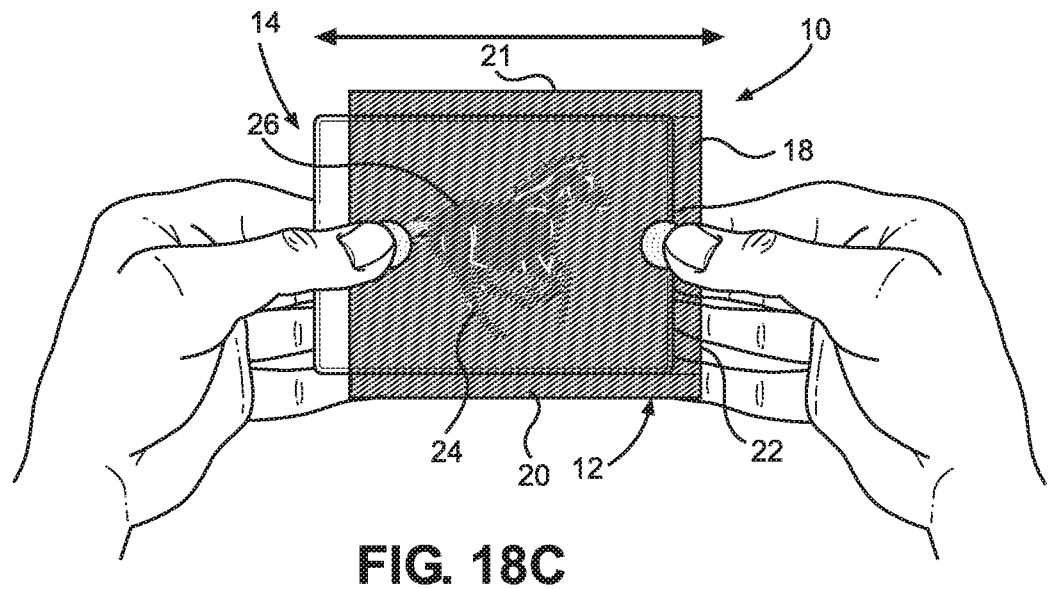
Figure 19:
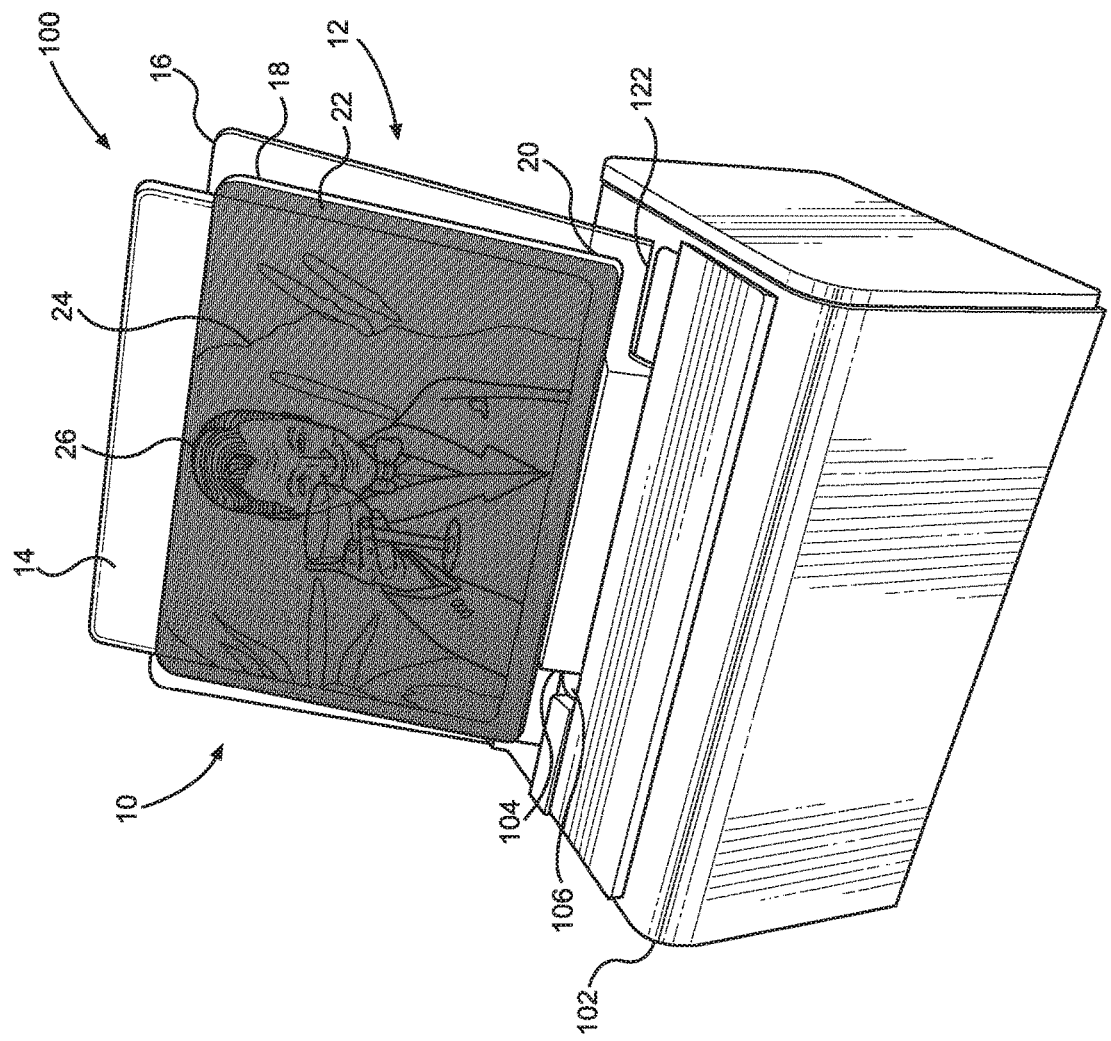
FIG. 19 is a perspective view of a coded image rocking device according to the present invention.
Figure 21:
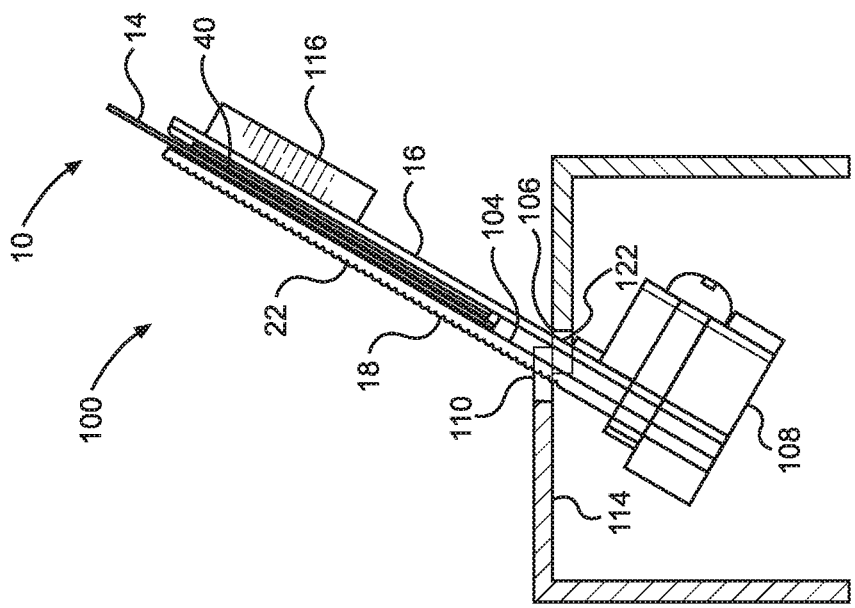
FIG. 21 is a partially sectioned view in side elevation of a coded image rocking device.
Figure 20:
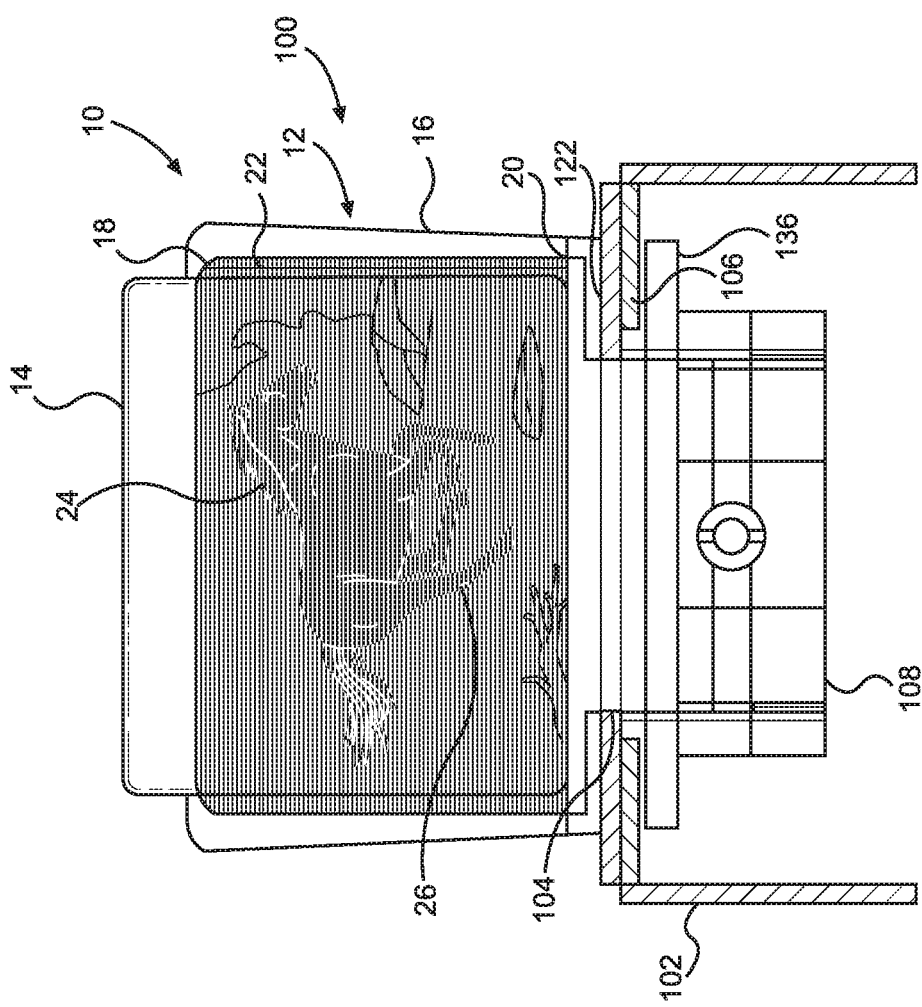
FIG. 20 is a partially sectioned view in front elevation of a coded image rocking device.
Figure 22:
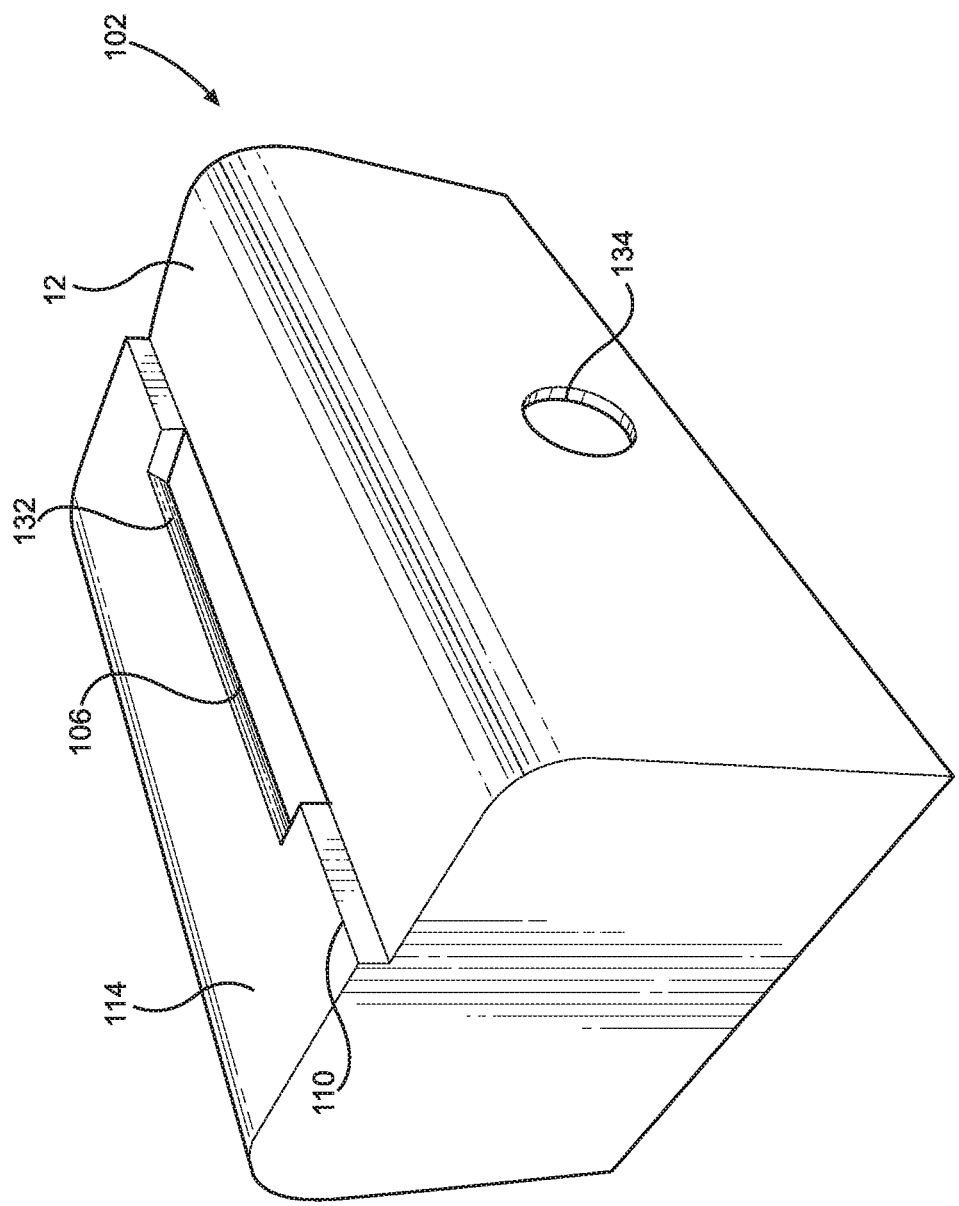
FIG. 22 is a perspective view of a podium for the coded image rocking device.

Another version of the coded image animation device 10 is illustrated in FIGS. 18A through 18C. There, the pressure system formed by the spring bed 40 is foregone thereby providing a simplified version of the device 10. The animation device 10 of FIGS. 18A through 18C is otherwise structurally and functionally similar to the embodiment previously described and shown in FIGS. 8 through 17C and so the detailed description of those matching aspects is incorporated herein by reference. In the embodiment of FIGS. 18A through 18C, a coded animation card 14 is simply installed in relation to the coded image viewer 12 by being slid into the channel between the panels 16 and 18. With the coded image card 14 thus disposed behind the front panel 18 and seated between the upper and lower rails 20 and 21, the user can place his or her thumbs on the left and right portions of the front surface of the front panel 18, such as on the "thumb" markings 52, and then use his or her forefingers to engage the coded image card 14 and slide it laterally left and right to produce animation.

In theory, the pressure applied by the thumbs and forefingers is operative to press the card 14 against the back of the lenticular plate formed by the front panel 18 and to promote surface-to-surface contact between the coded images 26 on the face of the coded image card 14 and the inner surface of the front panel 18 to maintain full or substantially full facing contact and disposition of the images 26 at the correct focal distance from the lenticules or other image decoding elements 22 of the front panel 18.

So disclosed, the foregoing embodiments of the coded image animation device 10 are operable by direct, hands-on actuation to display clear, reliable, realistically-cadenced, and continuous cycling animation of appreciably long-lasting duration. While certainly advantageous, it is appreciated that additionally enabling animation by a continuous rocking of the combined coded image card 14 and coded image viewer 12 to produce automatic animation over a continuous period of rocking would be desirable. Accordingly, the present inventor has devised of embodiments of the coded animation device as shown and described below that enable automatic animation after manual activation by a continuous rocking of the coded image animation device 10 formed by the combined coded image card 14 and coded image viewer 12.

Embodiments of the coded image animation device 10 as shown and described herein thus can incorporate steeply-tilted lenticules 22 or other image decoding elements 22 to slow the cadence of animation when a coded image card 14 is manually slid in relation thereto. For instance, embodiments are disclosed wherein the speed of animation is controlled by having 40 lpi lenticules 22 tilted as far as 88.5 degrees.

However, rather than being swiped or otherwise slid through the viewer 12, it is possible under the present invention for the card 14 to be left motionless inside the viewer 12 while the coded image animation device 10 is rocked forward and backward to produce animation of the coded images 26. Based on the present inventor's research and experience, the preferred speed of rocking in such a display would be one that imparts the impression of motion at the rate of approximately once cycle per ⅓ of a second. For example, a horse will appear to gallop realistically at three gallops (i.e., three cycles) per second.

Where animation is achieved by pivoting of the coded image card 14 and the coded image viewer 12, speed of animation can be characterized based on the angular rotational velocity of the coded image animation device 10. The desired angular rotational velocity can be based on angular velocity where revolution is achieved around a pivot point. In a conventional lenticular display, a full animation cycle, such as one gallop of a horse, could be visually completed with each 25 degrees of tilt. If one assumes that each animation cycle would desirably be completed over ⅓ of a second over 25 degrees of rotational movement, the desired angular velocity can be calculated as 11.11 rpm.

It is known that rocking devices have been disclosed wherein battery power is employed to rock a lenticular card that is retained by a fixed arm. The device rocks the lenticular display continuously for the life of the batteries, but the rate of pivoting is rapid so that the animation is unrealistically fast. For example, while a horse would look natural completing one gallop in one-third of a second, a complete gallop is completed in such a device in one-sixth of a second—twice faster—which disobeys the laws of physics and is not convincing to the observer. Moreover, such animation devices rely on battery power.

Appreciating the foregoing, the present inventor devised of a rocking animation device 100 as disclosed in FIGS. 19 through 28 wherein the coded animation device 10 is retained to rock forward and backward in a pivoting movement under manual activation by a user. There, rocking is achieved without external power by manual activation, such as the tap or push of a finger, to produce continuous rocking of the coded animation device 10 over a given time period, such as but not limited to 30 to 40 seconds.

Figure 29:
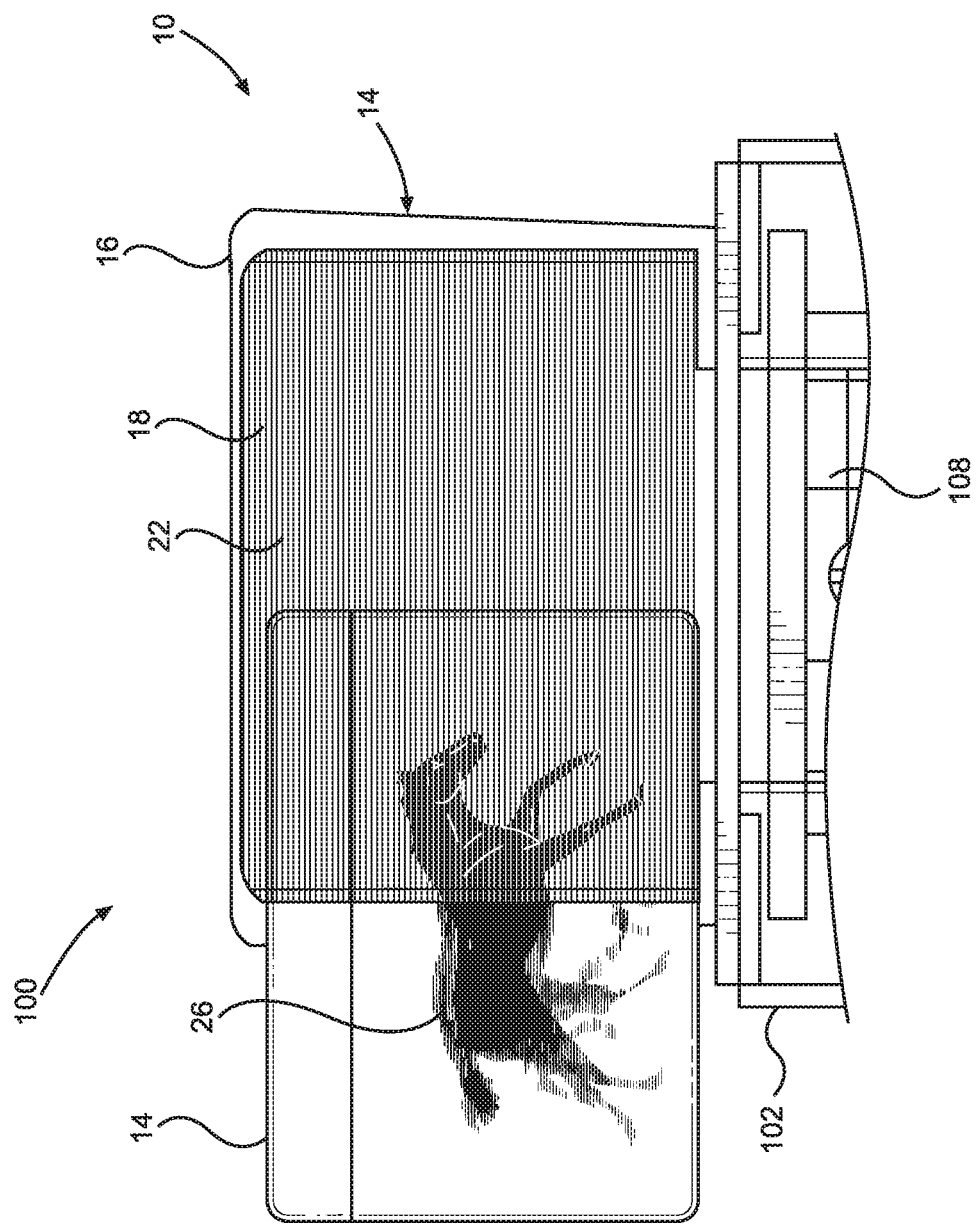
FIG. 29 is a view in front elevation of a coded image rocking device with horizontally disposed lenticules.

With combined reference to FIGS. 19 through 23, for instance, the rocking animation device 100 can be considered to be founded on an embodiment of the coded animation device 10. The coded animation device 10 can be similar to any of the embodiments disclosed herein whether that be a slotted configuration as, for instance, in FIGS. 1 through 7C where the lenticules 22 and coded images 26 are canted, a channel configuration as, for instance, in FIGS. 8 through 18C where the lenticules 22 and coded images 26 are again canted, or some other configuration wherein animation can be produced by a rocking effect. For example, as in FIG. 29, it is contemplated under the present rocking animation device 100 that embodiments of the coded image animation device 10 would be possible that forego sliding animation and that can thus have lenticules 22 and coded images 26 longitudinally disposed on the coded image viewer 12 and the coded image card 14. In such embodiments, animation would not be achieved by longitudinal sliding of the coded image card 14 within the viewer 12.

A lever 104 projects from the base of the coded image animation device 10 generally in a coplanar or parallel plane relationship with the panels 16 and 18. The lever 104 is centered longitudinally along the coded image animation device 10. The lever 104 can be considered to have a proximal end adjacent to the panels 16 and 18 of the coded image animation device 10 and a distal portion spaced therefrom. A counterweight structure 108 is retained by the distal portion of the lever 104.

A podium 102 pivotably supports the coded animation device 10, the lever 104, and the counterweight structure 108. Here, the podium 102 comprises a generally box-shaped structure defining a housing in which the counterweight structure 108 can freely swing, but it will be understood that other podium structures would be readily possible within the scope of the invention.

The podium 102 has an upper platform formed by a posterior platform section 112 and an anterior platform section 114. A slot 106 is disposed through the upper platform of the podium, and the lever 104 is received through the slot 106. More particularly, the slot 106 is disposed through the anterior platform section 114 to communicate laterally over a central portion of the upper platform. As best seen, for instance, in FIG. 25, the slot 106 has an anterior portion formed within the anterior platform section 114 and a posterior portion formed within the posterior platform section 112. The anterior platform section 114 is raised as compared to the posterior platform section 112. With that, a laterally communicating raised lip 110 is disposed at the junction where the posterior platform section 112 meets the anterior platform section 114, and the posterior platform section 112 lateral to the ends of the slot 106 form support shoulders. The slot 106 has a length, such as 2 and ¾ inches, that is greater than the width of the lever 104, which can be 2 and ½ inches, so that a marginal spacing, in this example ⅛ inch on each side of the slot 106.

Under this configuration, the coded image animation device 10, the lever 104, and the counterweight 108 form a unified pivoting structure with the coded image animation device 10 retained atop the podium 102, the lever 104 passing through the slot 106 in the podium 102, and the counterweight 108 disposed below the platform 112 of the podium 102 in which the slot 106 is disposed. Here, where the podium 102 comprises a hollow box, the counterweight structure 108 is retained within the podium 102 below the slot 106.

Figure 23:
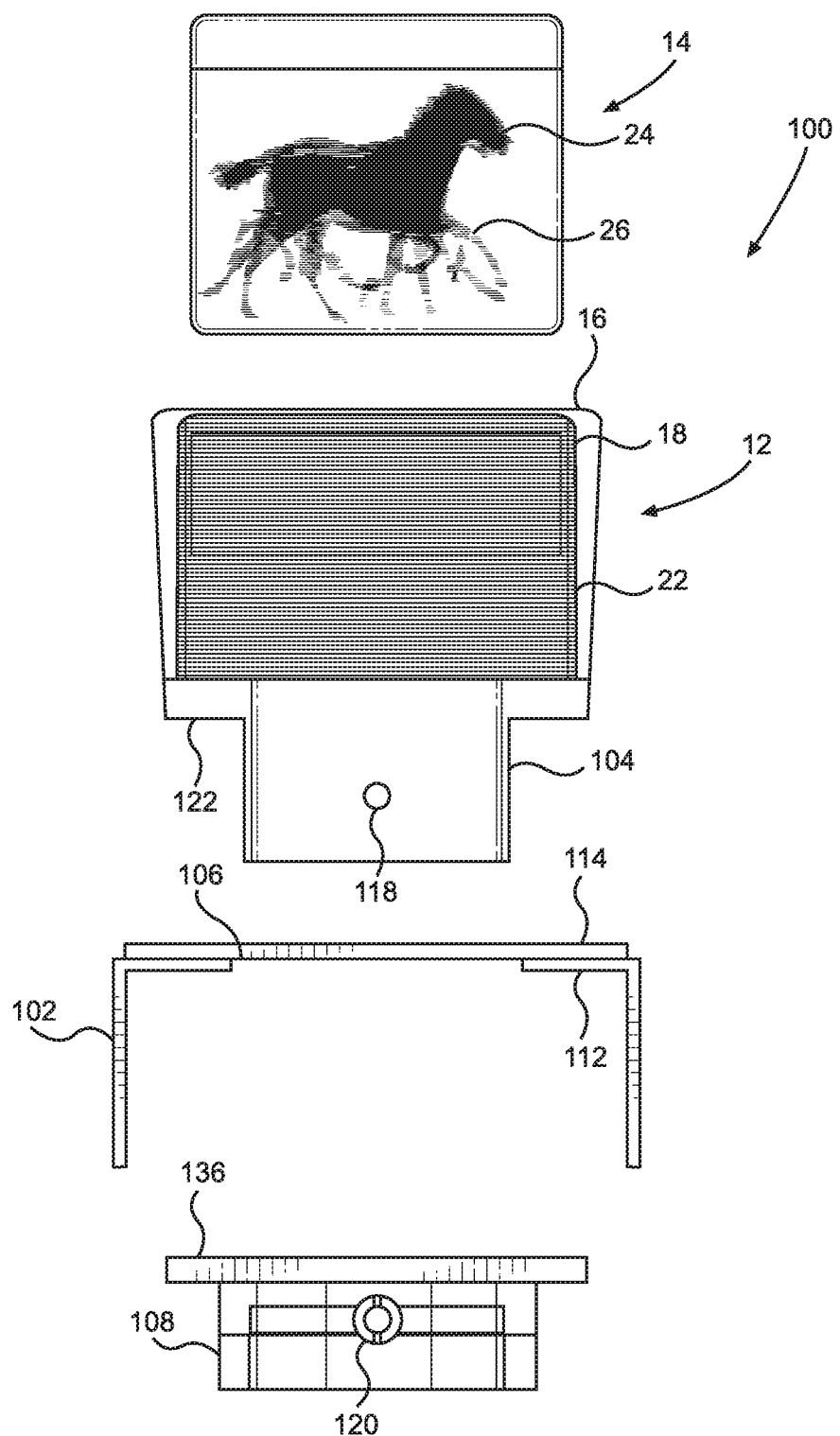
FIG. 23 is an exploded view in front elevation of the coded image rocking device.
Figure 24:
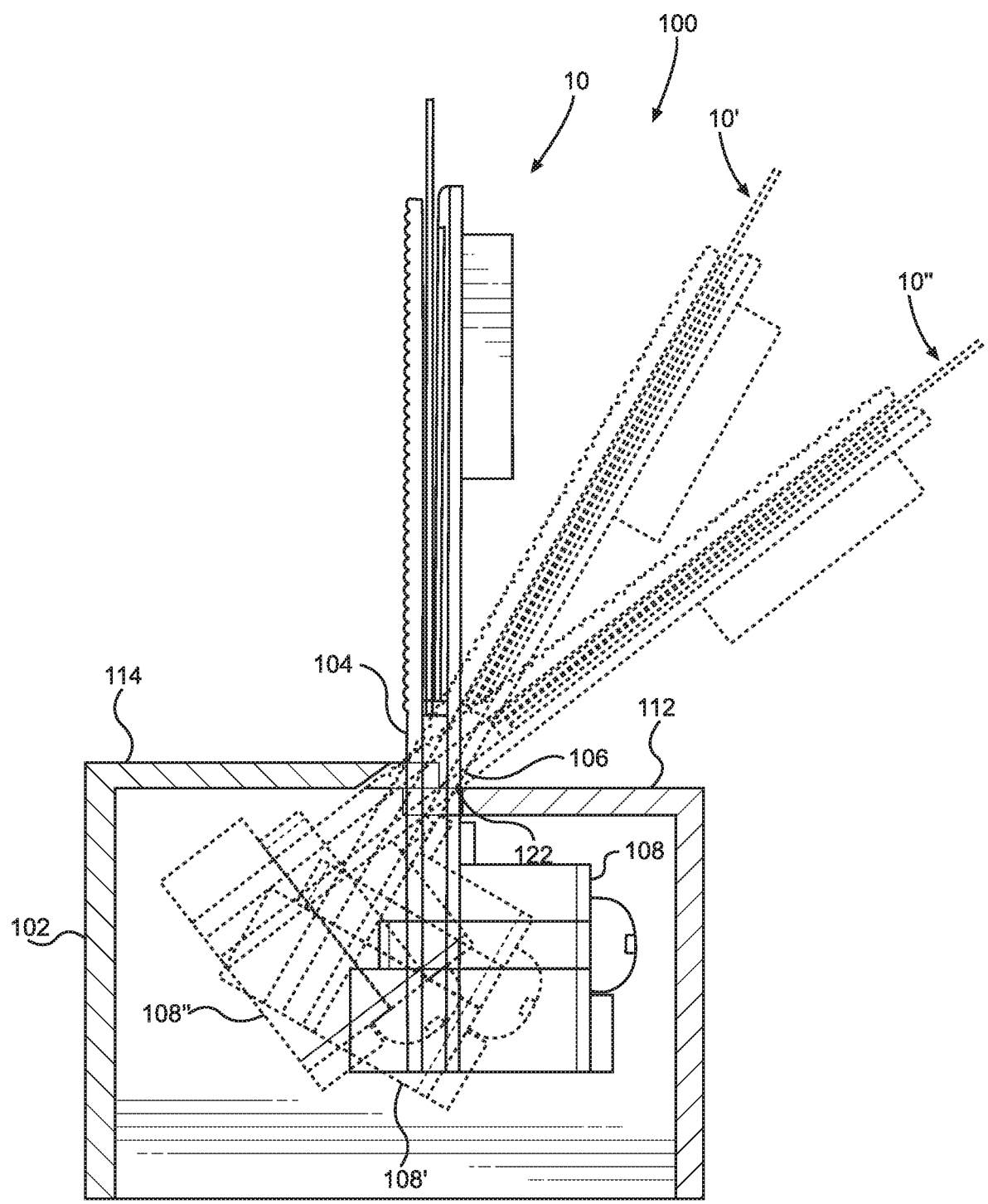
FIG. 24 is a partially sectioned view in side elevation of the coded image rocking device with the coded image viewer and the counterweight rocked to differing positions.
Figure 25:
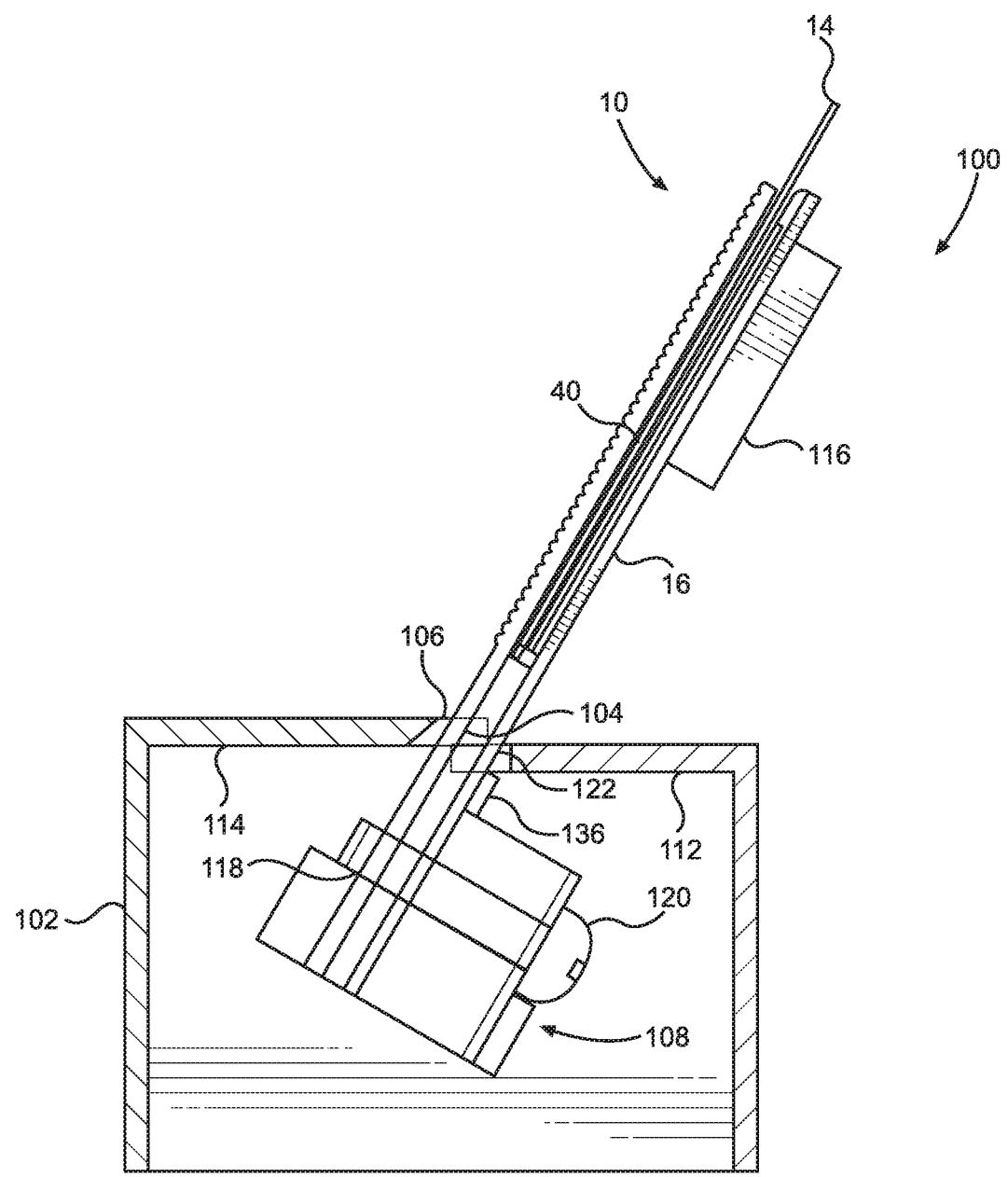
FIG. 25 is a partially sectioned view in side elevation of the coded image rocking device with the coded image viewer and the counterweight.

A fulcrum 122 of the pivoting structure is pivotably supported by the podium 102. In this embodiment, the fulcrum 122 is established below the coded image animation device 10 adjacent to the proximal portion of the lever 104. As shown in FIG. 23, for instance, the fulcrum 122 in this embodiment is established by fixed edges of the rear panel 16 of the coded image animation device 10 that are outboard of the lever 104. The fulcrum edges 122 rest on the support shoulders of the posterior platform section 112 of the support platform of the podium 102 adjacent to the raised lip 110 while the lever 104 projects through the slot 106. The raised lip 110 prevents misalignment of the pivoting structure as the fulcrum 122 rocks on the posterior platform section 112. One skilled in the art will appreciate other configurations and dispositions for the fulcrum 122, each within the scope of the invention except as may be expressly excluded by the claims.

Under the depicted construction, the slot 106 has a posterior edge defined by the posterior platform section 112 and an anterior edge defined by the raised anterior platform section 114. The posterior edge of the slot 106 is vertically disposed while the anterior edge of the slot 106 is formed with an undercut chamfer so that a rearwardly sloped surface is presented. With that, maximum rearward pivoting of the pivoting structure is permitted by the sloped surface of the anterior edge of the slot 106 while forward pivoting of the pivoting structure can be limited to approximately a vertical disposition, as both seen, for instance, in FIG. 26B.

The fulcrum 122 formed by the outboard sections of the rear panel 16 are thus the only portions of the pivoting structure that are pivotably supported by the podium 102. It has been found that it is preferable to keep this material as thin as possible. Further, the inventor's experiments have demonstrated that, counterintuitively, the pivoting structure appears to rock better with square cut bottoms of the rear panel 16 forming the fulcrum 122 as compared to rounded edges. It is believed that this derives from the fact that, when the pivoting structure rocks rearwardly from vertical, it comes to be supported only by the very fine posterior edges of the bottoms of the fulcrum 122.

After much research and experimentation, the present inventor devised of the weight, counterweight, and overall structure depicted and described herein to achieve the desired angular velocity of approximately 11.11 rpm. Where, for example, 25-degrees of rotational movement produces one cycle of animation and where each such cycle is desirably completed over ⅓ of a second, the angular velocity of 11.11 rpm produces animation at a realistic and natural cadence. A range of 10 to 12 rpm may be considered to be a preferred range of angular velocity while a range of 10.5 to 11.5 rpm may be considered to be more preferred and a particular angular velocity of 11.11 rpm is calculated to be the ideal angular velocity of the coded image animation device 10 as it pivots forward and backward about the fulcrum 122.

A goal of the inventor is to achieve such a relatively slow angular velocity while promoting rocking over the greatest possible time period and while being disposed in as compact a space as possible. Accordingly, it has been found that the mass, distribution, and placement of weight in the unified pivoting structure formed by the coded image animation device 10, the lever 104, and the counterweight 108 are critical and must be exact. It has been found that even the addition or removal of the coded image card 14, which might weigh just 4 grams, significantly affects the rocking speed of the pivoting structure. For example, with one coded image card 14 in place within the viewer 12, the unified pivoting structure will rock in either direction at the desired speed of approximately 11.11 rpm. If the card 14 is removed, the pivoting structure will rock about 50% faster. However, if a second coded image card 14 is added, the pivoting structure will simply tilt backward and stop rocking entirely.

As in FIGS. 19, 21, 25, and 26A, for instance, the pivoting structure in this non-limiting embodiment is balanced so that, when not rocking, the panels 16 and 18 of the coded image animation device 10 are disposed at a rearward resting tilt angle of approximately 30 degrees from vertical. Such a rearward resting tilt angle permits straight-on viewing as might be advantageous to game participants seated at a table upon which the rocking animation device 100 is placed. Different at-rest angles may be desired for other applications so that the rearward tilt angle of this embodiment is merely a non-limiting example.

Figure 26C:
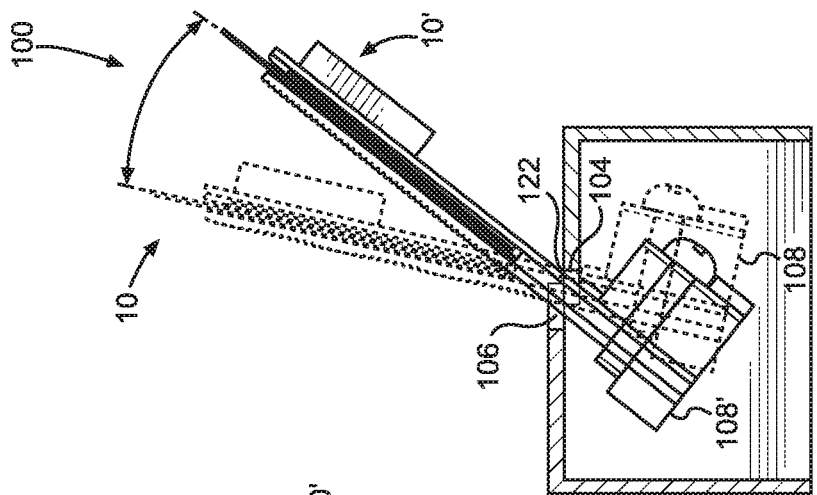
FIGS. 26A through 26C are partially sectioned views in side elevation of the coded image rocking device with the coded image viewer and the counterweight rocked to differing positions over time.
Figure 26B:
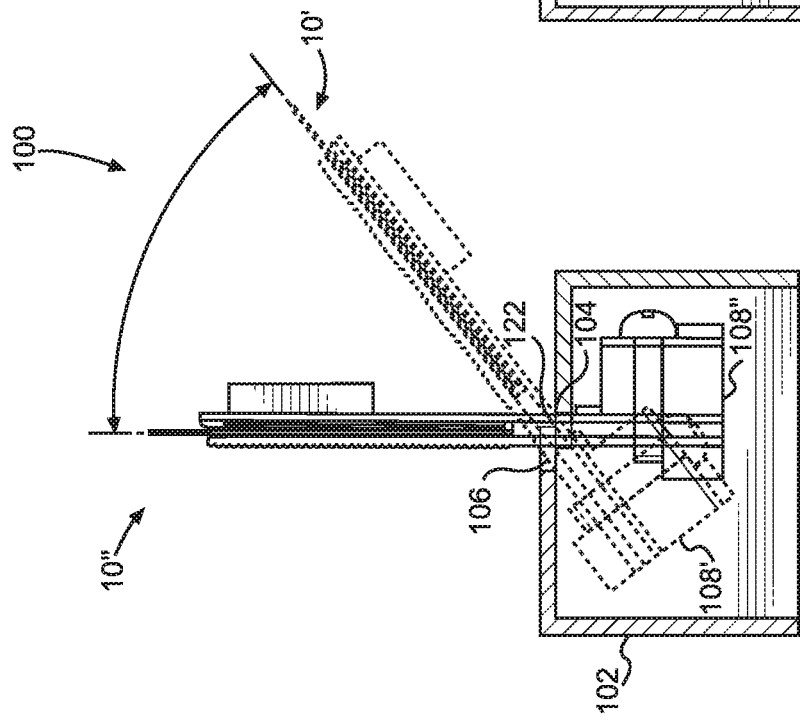
Figure 26A:
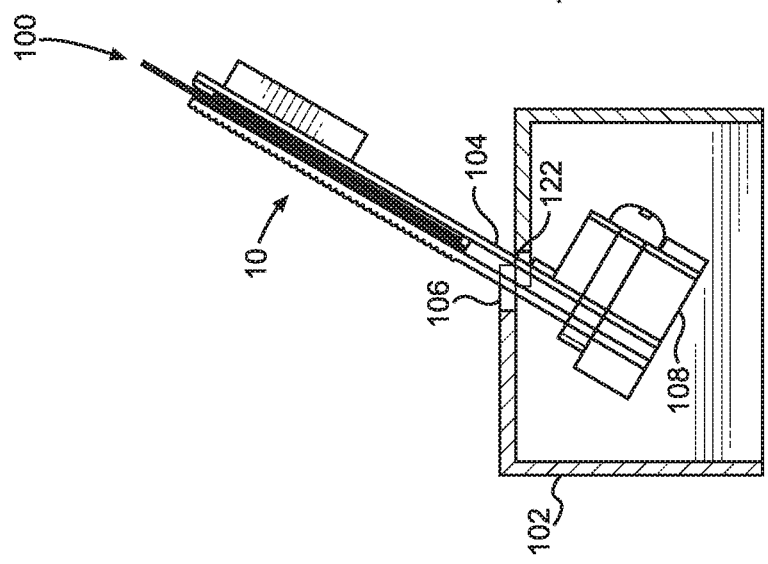
Figure 27C:
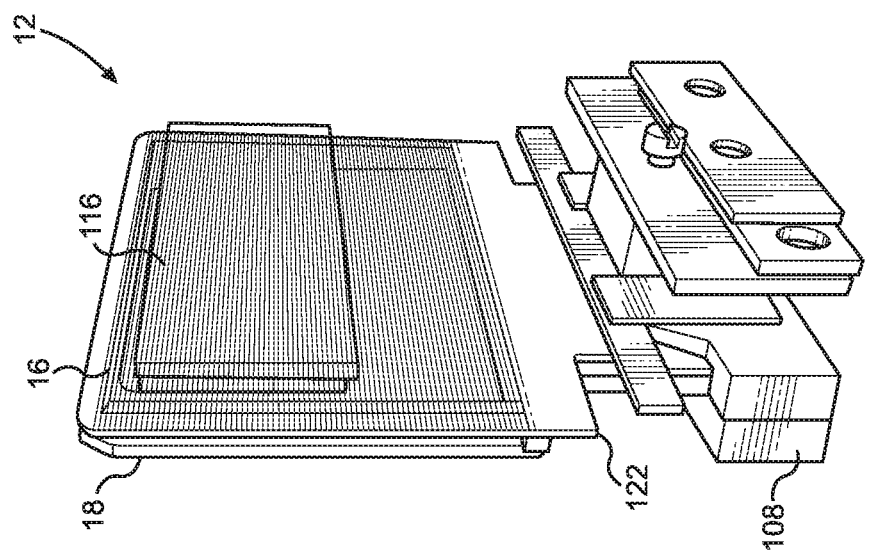
FIGS. 27A through 27C are perspective and side elevational views of the coded image viewer and counterweight structures of the coded image rocking device.
Figure 27B:
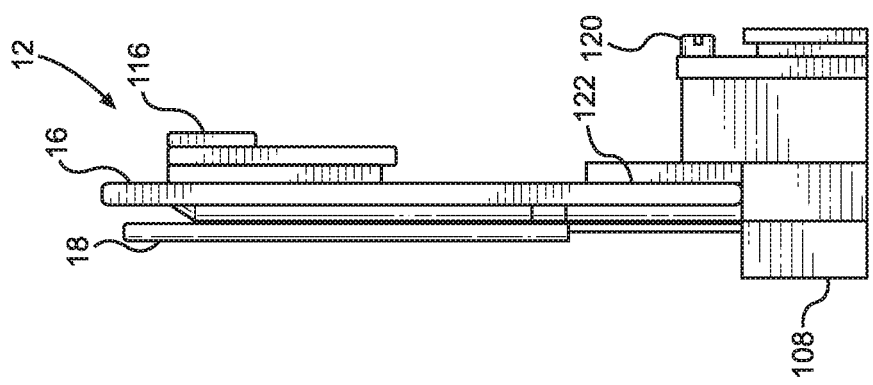
Figure 27A:
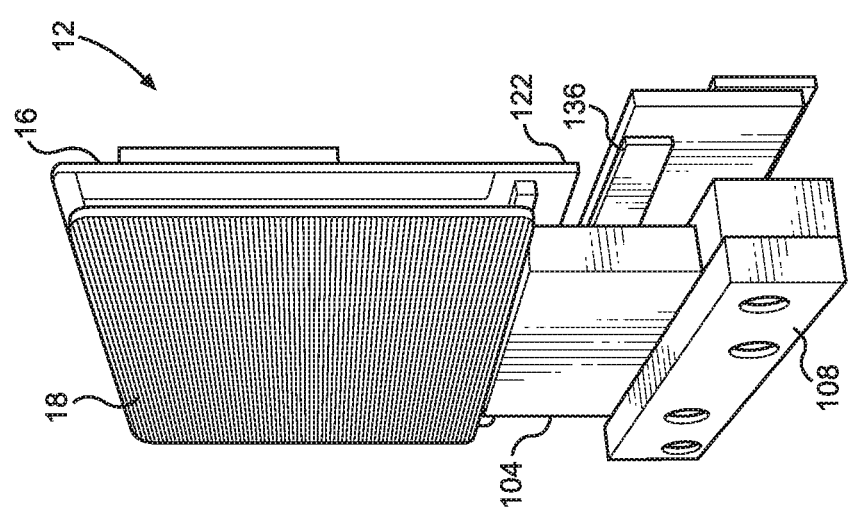

With further reference to FIGS. 26A through 26C, for example, the pivoting structure can be set into rocking motion, such as by the tap of a finger or otherwise. By such a manual actuation, the coded image animation device 10 is permitted to tilt further backward to a maximum rearward tilt angle, which in this example is 50 degrees, where the coded image animation device is indicated at 10' and the counterweight is indicated at 108'. By force of gravity, the counteracting force of the counterweight 108 will pivot the coded image animation device 10 forward at an angular velocity, such as 11.11 rpm, to a maximum forward tilt angle, which in this example is 0 degrees relative to vertical, where the coded image animation device is indicated at 10'' and the counterweight is indicated at 108''. With that, the maximum initial angular range of pivoting of the pivoting structure is 50 degrees. At approximately 11.11 rpm, pivoting over the entire forward and backward maximum initial angular range of pivoting consumes approximately 1.5 seconds.

The pivoting structure will repeatedly rock rearward and forward as potential energy in the pivoting structure is converted into kinetic energy and vice-versa. With each successive rocking movement, energy losses will cause the pivoting structure to pivot over progressively smaller angular ranges of pivoting, although its angular velocity in each direction will tend to remain consistent, such as at approximately 11.11 rpm. A realistic cadence to the animation is thus achieved for the duration of rocking of the pivoting structure. While the range of pivoting naturally decreases, the angular velocity of pivoting remains consistent.

Where the image decoding elements 22 comprise lenticules and where the lenticules 22 on the front panel 18 and the coded images 26 on the coded image card 14 are calibrated to cause a full cycle of animation to be achieved by a pivoting of the coded image animation device 10 over an angular range of 25 degrees, the maximum initial angular range of 50 degrees when the pivoting structure is actuated will yield two full animation cycles to be achieved. As energy is lost and the angular range of pivoting decreases, the animation cycling will correspondingly decrease. In the depicted and described embodiment, after approximately 30 seconds of rocking, the angular range of pivoting has been found to reduce to approximately 25 degrees, the range necessary to a complete animation cycle, as is depicted in FIG. 26C for example. After that rocking period, progressively less of the animation cycle is displayed to the stationary observer. Eventually, such as after approximately 45 seconds in one example, the pivoting structure comes to the rest position of FIG. 26A for example.

Figure 28:
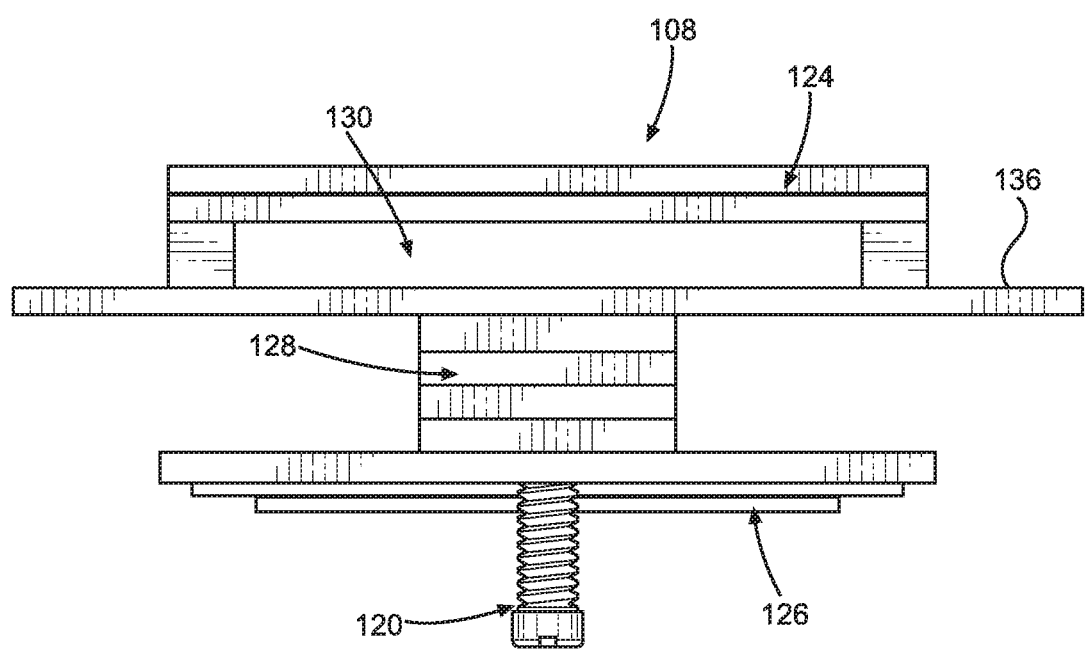
FIG. 28 is a plan view of the counterweight for the coded image rocking device.

A more detailed understanding of the structure of the counterweight 108 in the depicted embodiment can be had with additional reference to FIG. 28. With the counterweight 108 considered to have an anterior portion facing codirectionally with the outer surface of the front panel 18 and an anterior portion facing codirectionally with the outer surface of the rear panel 16, the counterweight 108 has a central opening 130 between the anterior and posterior portions. In assembly of the rocking animation device 100, the distal portion of the lever arm 104 is inserted into the central opening 130, and the counterweight 108 is affixed to the lever arm 104. Here, the counterweight 108 is detachably affixed to the lever arm 104 by a threaded setscrew fastener 120 that is received from the posterior direction into the counterweight 108 and into an aperture 118 in the lever arm 104 as shown, for instance, in FIG. 23. To facilitate insertion and manipulation of the fastener 120, an aperture 134 is disposed in a rear wall of the podium 102 to permit passage of the fastener 120 and a tool (not shown), such as a screwdriver.

Other mechanisms for retaining the counterweight 108 relative to the lever arm 104 would be readily possible and within the scope of the invention. By way of further non-limiting examples, the counterweight 108 could be integrally formed with the lever arm 104 or retained by a snap-fit connection, a frictional engagement, adhesive, welding, or any other effective method or combination thereof. In other practices of the invention, a stop or other alignment mechanism can be provided on the lever arm 104 to seat and square the counterweight 108 in relation to the lever arm 104 and to ensure exact placement of the counterweight 108.

A cross retaining bar 136 is fixed to the counterweight 108 so that, when the counterweight 108 is retained by the lever arm 104, the retaining bar 136 is marginally spaced below the lower surface of the support platform 112 of the podium 102 by a distance sufficient to permit the maximum range of pivoting of the pivoting structure while being in sufficient proximity to the lower surface of the platform 112 to prevent wobble and displacement of the pivoting structure in relation to the podium 102. It is also contemplated, although not illustrated, that a reinforcement structure may be added to the pivoting structure, particularly the coded image animation device 10, to prevent damage during shipping and usage.

Again referring to FIG. 28, the counterweight 108 has an anterior mass 124 of high-density material, such as a high-density metal or other high-density material, retained anterior to the central opening 130 and a posterior mass 126 of high-density material retained posterior to the central opening 130. The posterior high-density mass 126 is retained spaced from the central opening 130 by spacer material 128 of low-density material, such as a plastic or another low-density material. Further, a mass 116 is affixed to the rear panel 16 of the coded image animation device 10 to produce the desired resting tilt angle, angular velocity during rocking, and other characteristics of the rocking animation device 100.

It will be understood that the details of the embodiments of the rocking animation device 100 disclosed herein are non-limiting but are designed to ensure a full understanding of the structure and operation of the broader invention for rocking animation device 100. For instance, the particular weights and the placement thereof shown and described herein are specific to one or more potential embodiments of the invention. Alteration of particular weights and additionally or alternatively their locations would affect, among other things, the resting tilt angle of the coded image animation device 10, the angular velocity of the pivoting structure, and other aspects of the structure and performance of the rocking animation device 100.

With this recognition that the materials, weights, dimensions, relative configurations, and other details of the rocking animation device 100 can vary within the scope of the invention, certain non-limiting particularities are taught herein. For instance, in one embodiment, the portion of the coded image animation device 10 above the fulcrum 122 can have a weight of approximately 44 grams while the mass affixed to the rear panel 16 of the device 10 can have a mass of approximately 22 grams. The weight of the lever arm 104 projecting below the fulcrum 122, which lever arm 104 is in this embodiment formed by a continuation of the front and rear panels 18 and 16 of the animation device 10 is approximately 15 grams. The anterior mass 124 has a weight of 48 grams and is spaced approximately ⅜ inch anterior of the plane in which the rear panel 16 forming the fulcrum 122 is disposed, and the posterior mass has a weight of 23 grams and is spaced 1 and ⅛ inches posterior of the plan in which the rear panel 16 is disposed. The weight of a coded animation card 14 in potential embodiments is approximately 4 grams.

As such, the total weight of the pivoting structure with a coded image card 14 installed within the coded image viewer is approximately 178 grams. The weight of the pivoting structure below the fulcrum 122 is approximately 108 grams, or 60.67% of the total weight of the pivoting structure, while the weight of the pivoting structure above the fulcrum 122 is approximately 70 grams, or 39.33% of the total weight of the pivoting structure.

Figure 30:
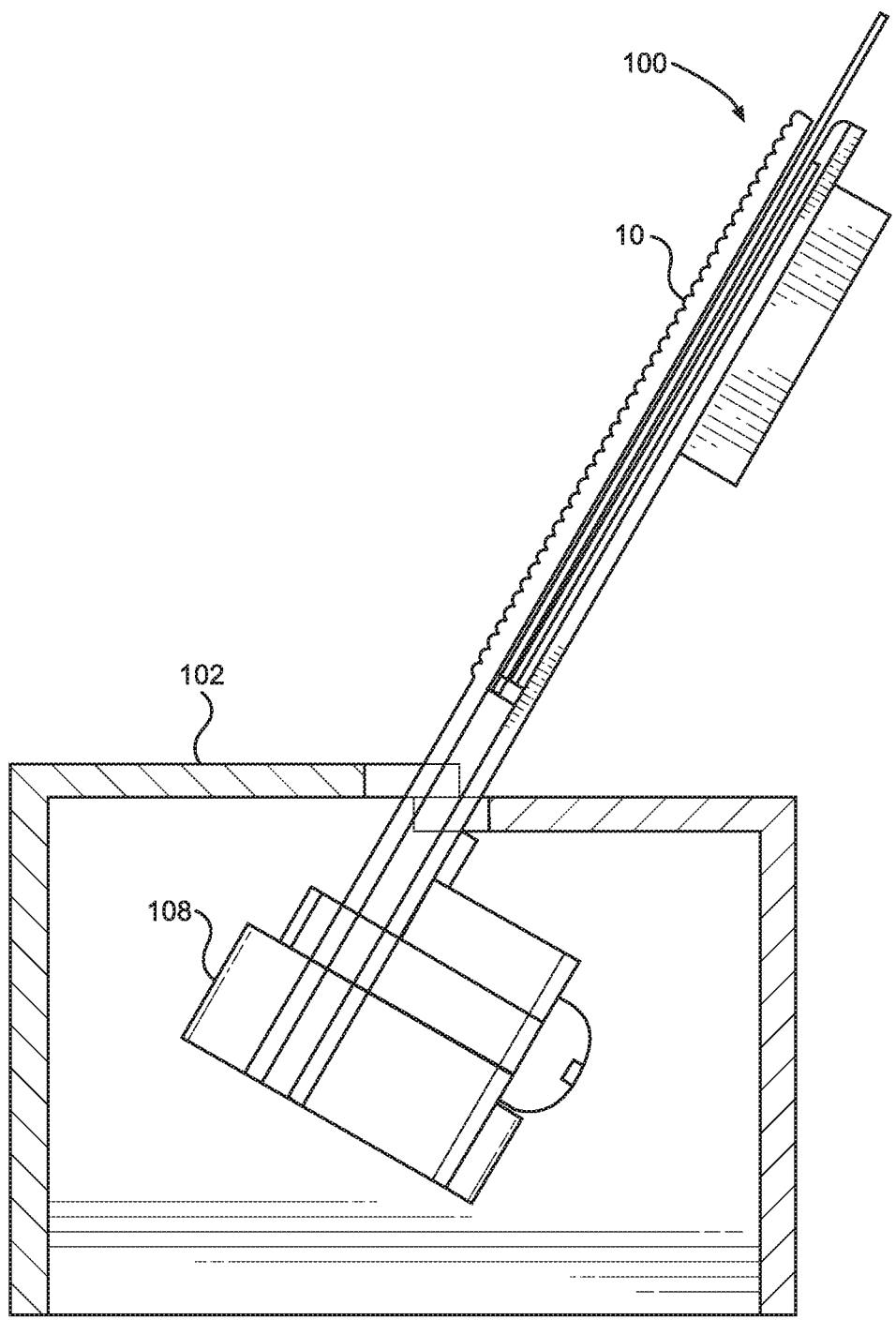
FIG. 30 is a partially sectioned view in side elevation of the coded image rocking device superimposed on a grid of one-inch blocks and one-eighth inch demarcations.
Figure 31:
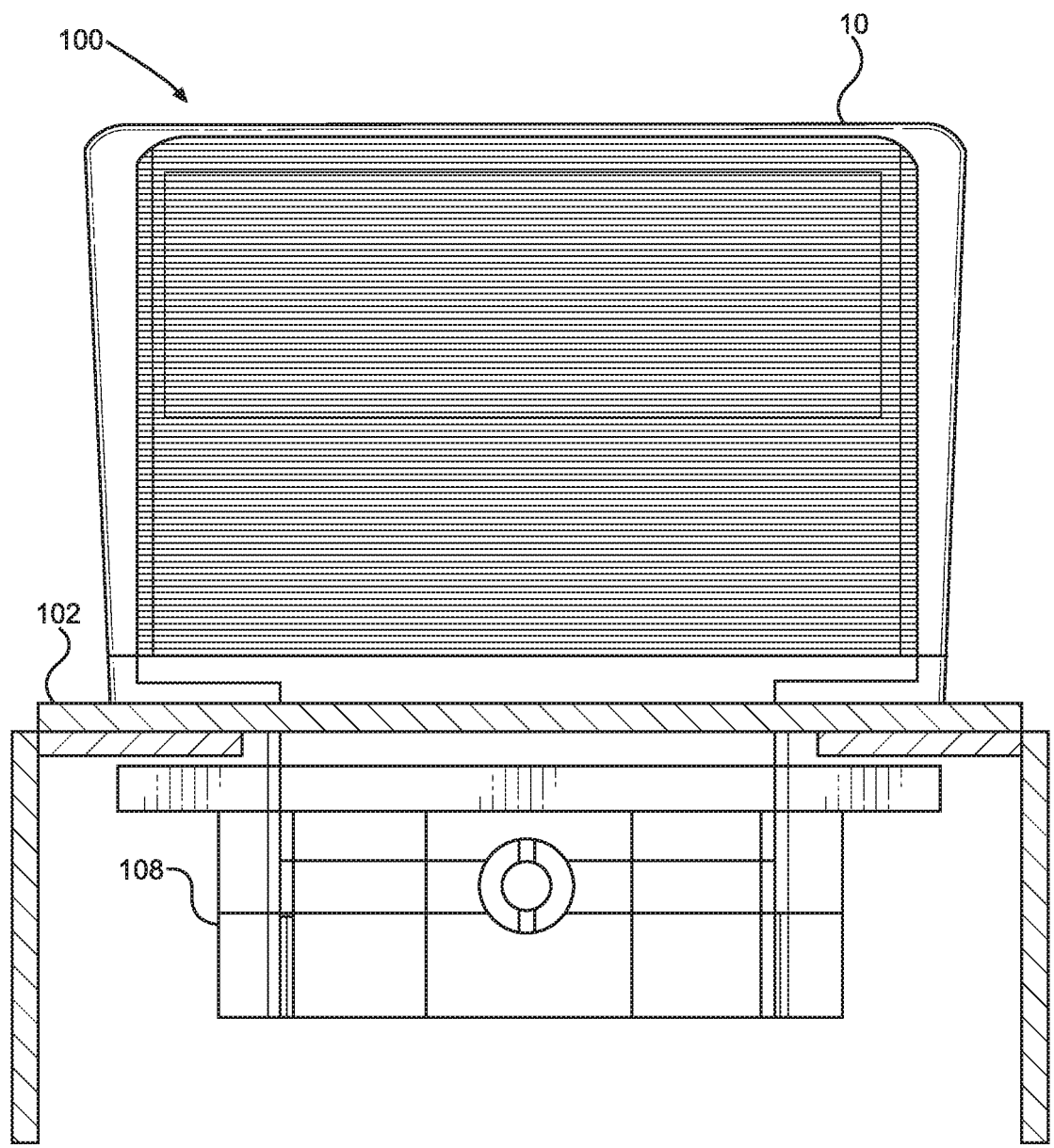
FIG. 31 is a partially sectioned view in front elevation of the coded image rocking device superimposed on a grid of one-inch blocks and one-eighth inch demarcations.

Looking further to FIGS. 30 and 31, the coded image rocking device 100 is superimposed on a grid of one-inch blocks with one-eighth inch demarcations. From these depictions, further dimensions and relative sizes and positions can be understood. All such information that can be adduced from these renderings of potential embodiments of the rocking animation device 100 is incorporated herein by reference.

In combination, the foregoing weights and relative weights and dispositions have the effect of permitting the rocking animation device 100 to produce an angular velocity of the pivoting structure of approximately 11.11 rpm, which again has been found to be advantageous for realistic cadence of animation.

With certain details and embodiments of the coded image animation device 10 and rocking animation device 100 disclosed, it will be appreciated by one skilled in the art that numerous changes and additions could be made thereto without deviating from the spirit or scope of the present invention. This is particularly true when one bears in mind that the presented preferred embodiments merely exemplify the broader invention revealed herein. Accordingly, it will be clear that those with major features in mind could craft embodiments that incorporate those major features while not incorporating all of the features included in the preferred embodiments.

Therefore, the following claims define the scope of protection to be afforded to the inventor. Those claims shall be deemed to include equivalent constructions insofar as they do not depart from the spirit and the scope of the invention. It must be further noted that a plurality of the following claims may express or be interpreted to express certain elements as means of performing a specific function, at times without the recital of structure of material. As the law demands, any such claim shall be construed to cover not only the corresponding structure and material expressly described in this specification but also all legally cognizable equivalents thereof.

What is claimed as deserving of Letters Patent is:

1. A manually-operated coded image animation device comprising:

a coded image card;

a coded image viewer with a front panel with a first end and a second end, a rear panel structure, an open-ended slot between the front panel and the rear panel structure, a base member that defines a sliding surface for the coded image card, and coded image decoding elements disposed on the front panel, wherein the slot has left and right sides, wherein the slot is open on the left and right sides, wherein the coded image decoding elements are disposed at a diagonal angle with respect to the sliding surface defined by the base member, wherein the base member retains the front panel and the rear panel structure;

wherein the coded image card has an edge for sliding along the sliding surface defined by the base member of the coded image viewer;

a plurality of coded images retained on the coded image card wherein the plurality of coded images are disposed at a diagonal angle relative to the edge of the coded image card;

a biasing system for biasing the coded image card into face-to-face contact with the front panel, wherein the biasing system comprises a spring bed and a pressure plate biased toward the front panel by the spring bed;

wherein the diagonal angles of the coded image decoding elements and the coded images are substantially equal whereby a rate of displayed animation of the coded images per unit movement of the coded image card in relation to the coded image viewer is controlled and wherein the coded image decoding elements disposed on the front panel and the coded images retained on the coded image card are disposed at an angle of between 80 and 85 degrees from perpendicular to the sliding surface and the edge of the coded image card respectively;

whereby the coded image card can be manually inserted into the slot in the coded image viewer and slid in relation to the coded image viewer along the sliding surface defined by the base member to cause the coded image decoding elements to decode the coded images on the coded image card.

2. The coded image animation device of claim 1 wherein the coded image decoding elements comprise lenticules retained by the front panel.

3. The coded image animation device of claim 1 further comprising a recessed area within the rear structure and wherein the spring bed is retained within the recessed area.

4. The coded image animation device of claim 1 further comprising at least one guide extension of the rear structure that extends beyond the first end of the front panel.

5. The coded image animation device of claim 1 wherein the slot of the coded image viewer is open on the top side thereof.

6. The coded image animation device of claim 1 wherein the coded image decoding elements are disposed at a count of approximately 30 per inch.

7. The coded image animation device of claim 1 wherein the coded image decoding elements disposed on the front panel and the coded images retained on the coded image card are disposed at an angle of approximately 83.5 degrees from perpendicular to the sliding surface and the edge of the coded image card respectively.

\* \* \* \* \*